United States Patent
Vorabbi et al.

(10) Patent No.: US 10,262,436 B2
(45) Date of Patent: *Apr. 16, 2019

(54) SYSTEM FOR MULTIPLE DECODE OF CAPTURED IMAGES

(71) Applicant: Datalogic IP Tech S.r.l., Bologna (IT)

(72) Inventors: Lorenzo Vorabbi, Rimini (IT); Stefano Santi, Eugene, OR (US)

(73) Assignee: Datalogic IP Tech S.R.L., Bologna (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,053

(22) Filed: Aug. 6, 2018

(65) Prior Publication Data

US 2019/0066332 A1  Feb. 28, 2019

Related U.S. Application Data

(63) Continuation-in-part of application No. 15/686,671, filed on Aug. 25, 2017, now Pat. No. 10,078,774.

(51) Int. Cl.
| | |
|---|---|
| *G06K 7/10* | (2006.01) |
| *G06T 7/73* | (2017.01) |
| *G06T 1/00* | (2006.01) |
| *G06K 7/14* | (2006.01) |

(52) U.S. Cl.
CPC ............ *G06T 7/74* (2017.01); *G06K 7/10851* (2013.01); *G06K 7/10881* (2013.01); *G06K 7/1491* (2013.01); *G06T 1/0007* (2013.01)

(58) Field of Classification Search
CPC .. G06K 7/10; G06K 9/18; G06K 5/04; G06K 9/32; G06K 9/36; G08C 21/00; G06F 17/00
USPC ....... 235/462.09, 462.07, 462.1, 462.11, 375
See application file for complete search history.

(56) References Cited

U.S. PATENT DOCUMENTS

| | | | | |
|---|---|---|---|---|
| 6,814,290 B2* | 11/2004 | Longacre | ................. | G06K 7/14 235/462.08 |
| 2002/0122564 A1* | 9/2002 | Rhoads | .................. | G01C 11/00 382/100 |

* cited by examiner

*Primary Examiner* — Edwyn Labaze
(74) *Attorney, Agent, or Firm* — The Juhasz Law Firm

(57) ABSTRACT

A decoding device includes storage to store image data including grayscale values of pixels in multiple captured images, and a processor including multiple SIMD components and at least one component. For each captured image at least one available SIMD component performs: at least one transform with the grayscale values of at least one portion of the captured image to generate at least one corresponding metadata; and the at least one transform in preparation for an analysis of the at least one metadata by the at least one core component. The at least one core component is to perform: the analysis to identify at least one ROI within the captured image indicated by the at least one metadata to include at least one encoded data marking; and a decoding of the at least one ROI to attempt a decode of the at least one encoded data marking.

32 Claims, 27 Drawing Sheets

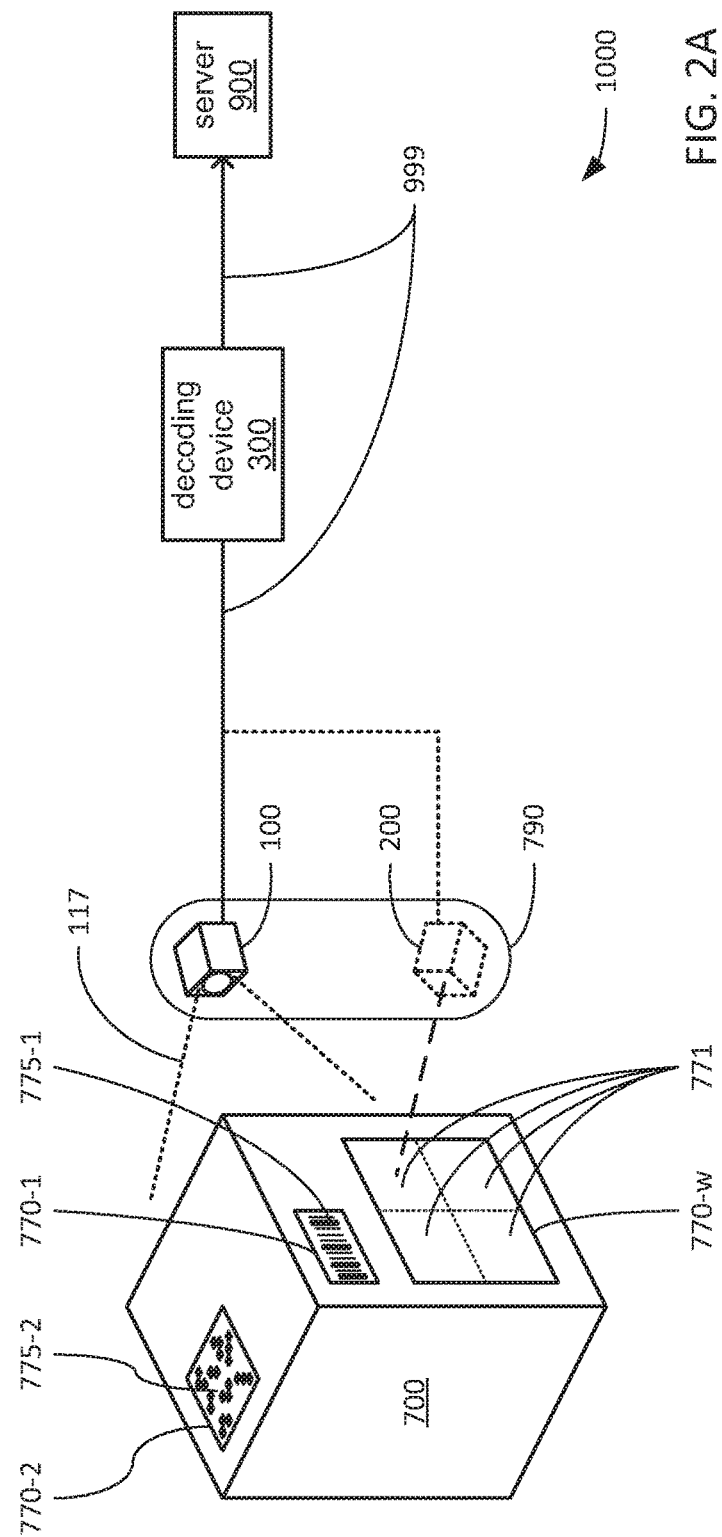

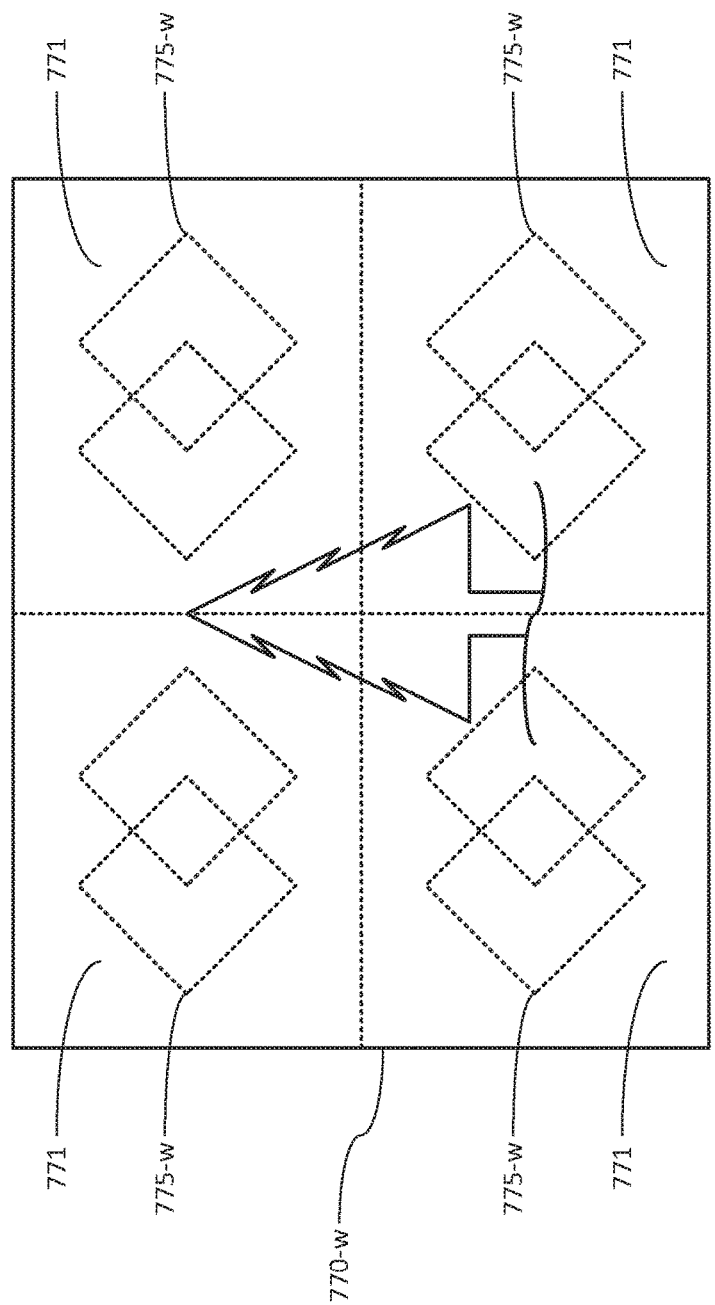

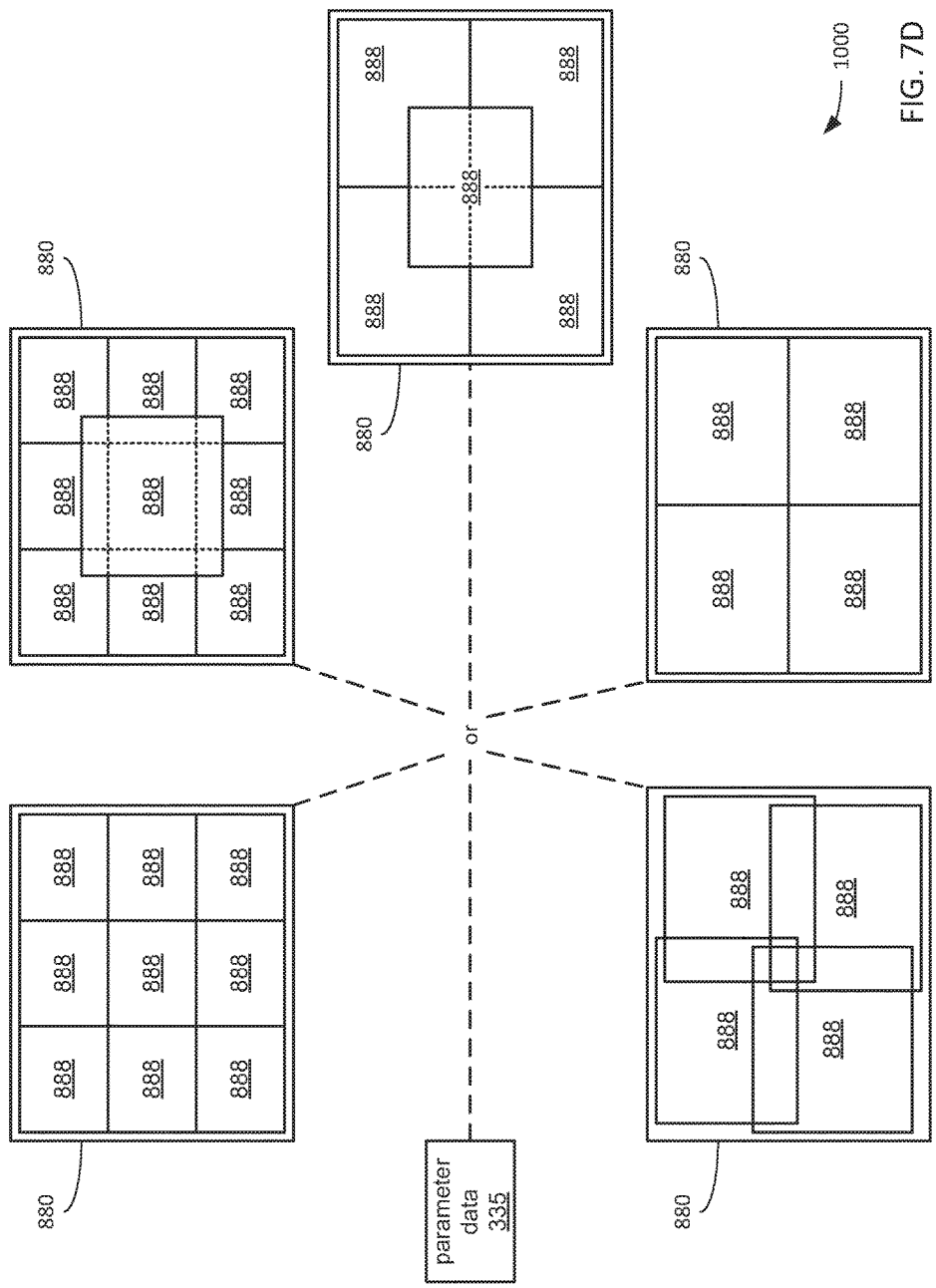

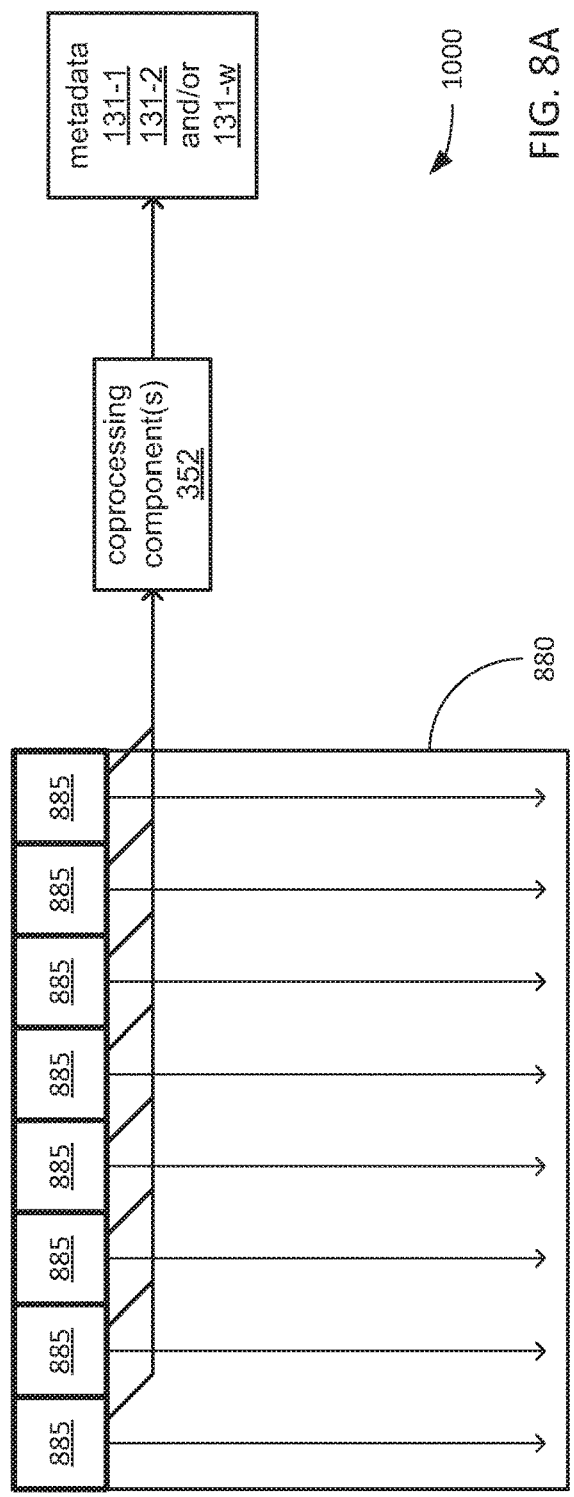

SYSTEM FOR MULTIPLE DECODE OF CAPTURED IMAGES

RELATED APPLICATIONS

This present application is a continuation-in-part of U.S. patent application Ser. No. 15/686,671 entitled "SIMD-BASED SYSTEM FOR MULTIPLE DECODE OF CAPTURED IMAGES" and filed Aug. 25, 2017, which is hereby incorporated by reference in its entirety for all purposes.

This application is related to U.S. patent application Ser. No. 15/686,614 entitled "CODED IMAGE CAPTURE AND DECODING SYSTEM" and filed Aug. 25, 2017, which is also hereby incorporated by reference in its entirety for all purposes.

BACKGROUND OF THE INVENTION

1. Field of the Invention

The present invention relates to systems for use of co-processing components within processors in multiple decode of encoded data markings applied to surfaces of objects.

2. Description of the Related Art

The application of encoded data markings that encode data, such as indicia or digital watermarks, to a surface of an object for subsequent capture and decoding to retrieve data encoded therein is well known. Also well known is the use of a camera to capture an image of such a surface in an effort to capture an image of one or more encoded data markings for decoding.

Such a camera may be a stationary camera positioned to cover a location at which an object bearing one or more of such encoded data markings may be placed and/or through which such an object may be transported. By way of example, such a camera may be positioned to place a doorway or portion of the interior of a warehouse within its field of view (FOV) to enable the capture of one or more encoded data markings carried on a surface of an object (e.g., a box, a crate, a palletized load, etc.) as the object is transported into the warehouse, is stored within the portion of the warehouse, and/or is transported out of the warehouse.

As will be familiar to those skilled in the art, searching through a captured image to identify each such encoded data marking, and then interpreting each identified encoded data marking to decode the data encoded therein are typically processing-intensive tasks. In particular, the processing demands of searching through a captured image to identify each encoded data mark that may be present are sufficiently great that the use of specialized circuitry implemented within an application-specific integrated circuit (ASIC) or field-programmable gate array (FPGA), in addition to a processor, to offload such work from the processor has been considered.

However, pairing such additional circuitry with a processor typically adds considerable undesired expense and complexity to decoding devices, and/or typically undesirably increases the power consumption of decoding devices. Further, as increased use of encoded data markings results in increasingly frequent instances of objects carrying multiple ones of indicia and/or digital watermarks, such additional circuitry often lacks the flexibility that is increasingly needed to perform searches and/or decodes of differing combinations of indicia and/or digital watermark that may be present on surface(s) of an object, and therefore, within a captured image.

Thus, a system able to more efficiently perform searches and/or decodes of differing indicia and/or digital watermarks, or differing combinations thereof, is needed.

SUMMARY OF THE INVENTION

Technologies are described for making more efficient use of processing resources in identifying and interpreting differing encoded data markings, such as differing indicia and/or digital watermarks, within an image of at least a portion of an object captured by a camera without augmentation of a processor with external specialized circuitry to offload processing operations from the processor.

A decoding device includes: storage configured to store image data received from at least one camera, wherein the image data comprises grayscale values of pixels in a two-dimensional (2D) array of pixels in each captured image of multiple captured images that are captured by the at least one camera; and a processor coupled to the storage. The processor includes multiple single-instruction multiple data (SIMD) components, wherein, for each captured image: at least one available SIMD component of the multiple SIMD components is selected to perform at least one transform with the grayscale values of the pixels of at least one portion of the captured image to generate at least one metadata that corresponds to the captured image; and the at least one available SIMD component is configured to perform the at least one transform in preparation for an analysis of the at least one metadata by at least one core component. The processor also includes the at least one core component configured to: perform the analysis of the at least one metadata to identify at least one region of interest (ROI) within the captured image that is indicated by the at least one metadata to include at least one encoded data marking; and perform a decoding of the at least one ROI identified within the captured image to attempt a decode of the at least one encoded data marking within the at least one ROI.

A decoding system includes: multiple cameras, wherein each camera comprises an image sensor configured to capture an image of multiple captured images, and each camera output a captured image of the multiple captured images as a bitstream of image data comprising grayscale values of pixels in a two-dimensional (2D) array of pixels of the captured image; and a processor coupled to the multiple cameras. The processor includes multiple single-instruction multiple data (SIMD) components, wherein, for each captured image: at least one available SIMD component of the multiple SIMD components is selected to perform at least one transform with the grayscale values of the pixels of at least one portion of the captured image to generate at least one metadata that corresponds to the captured image; and the at least one available SIMD component is configured to perform the at least one transform in preparation for an analysis of the at least one metadata by at least one core component. The processor also includes the at least one core component configured to: perform the analysis of the at least one metadata to identify at least one region of interest (ROI) within the captured image that is indicated by the at least one metadata to include at least one encoded data marking; and perform a decoding of the at least one ROI identified within the captured image to attempt a decode of the at least one encoded data marking within the at least one ROI.

A decoding device includes: storage configured to store image data received from at least one camera, wherein the image data comprises grayscale values of pixels in a two-dimensional (2D) array of pixels in each captured image of multiple captured images that are captured by the at least one camera; and a processor coupled to the storage. The processor includes multiple graphics processing unit (GPU) components, wherein, for each captured image: at least one available GPU component of the multiple GPU components is selected to perform at least one transform with the grayscale values of the pixels of at least one portion of the captured image to generate at least one metadata that corresponds to the captured image; and the at least one available GPU component is configured to perform the at least one transform in preparation for an analysis of the at least one metadata by at least one core component. The processor also includes the at least one core component configured to: perform the analysis of the at least one metadata to identify at least one region of interest (ROI) within the captured image that is indicated by the at least one metadata to include at least one encoded data marking; and perform a decoding of the at least one ROI identified within the captured image to attempt a decode of the at least one encoded data marking within the at least one ROI.

BRIEF DESCRIPTION OF THE DRAWINGS

FIGS. 2A and 2B, together, show aspects of an example use of an example implementation of the system of FIG. 1.

FIGS. 7A, 7B, 7C, 7D and 7E, together, show aspects of identifying and decoding a digital watermark in a captured image.

FIGS. 8A, 8B and 8C, together, show aspects of parallel performances of a transform to derive metadata of an image.

DETAILED DESCRIPTION OF THE INVENTION

Figure 1A:
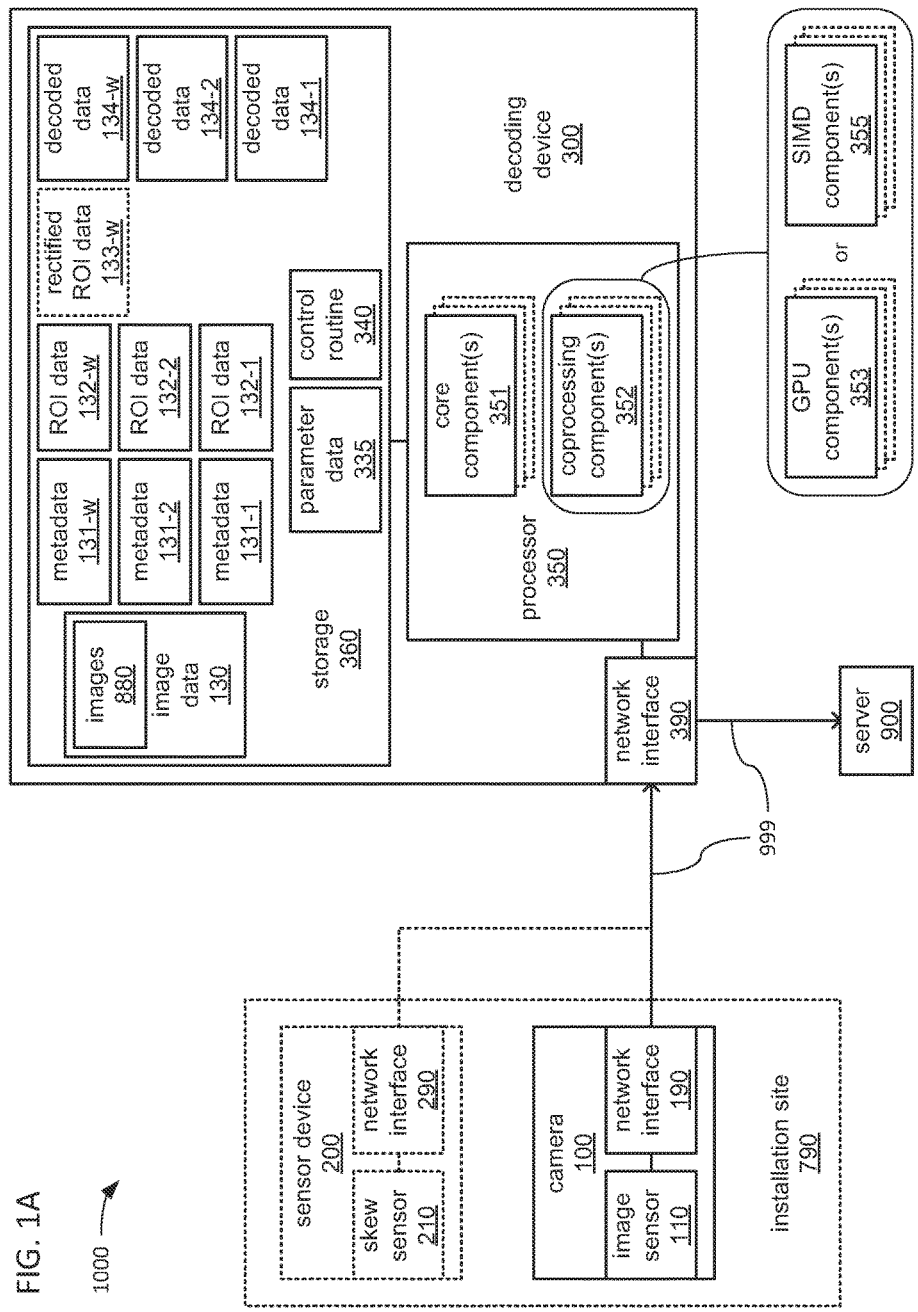
FIGS. 1A, 1B, 1C, 1D, 1E, 1F and 1G, together, show aspects of example implementations of a decoding system.

This detailed disclosure further incorporates by reference the disclosure provided in U.S. patent application Ser. No. 15/686,671 entitled "SIMD-BASED SYSTEM FOR MULTIPLE DECODE OF CAPTURED IMAGES" and filed Aug. 25, 2017, and the disclosure provided in U.S. patent application Ser. No. 15/686,614 entitled "CODED IMAGE CAPTURE AND DECODING SYSTEM" and also filed Aug. 25, 2017.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a decoding system to identify and decode one or more encoded data markings that encode data, such as indicia and/or digital watermarks, and that are included within an image of at least a portion of an object captured by a camera. A decoding device includes: storage configured to store image data received from at least one camera, wherein the image data comprises grayscale values of pixels in a two-dimensional (2D) array of pixels in each captured image of multiple captured images that are captured by the at least one camera; and a processor coupled to the storage. The processor includes multiple single-instruction multiple data (SIMD) components, wherein, for each captured image: at least one available SIMD component of the multiple SIMD components is selected to perform at least one transform with the grayscale values of the pixels of at least one portion of the captured image to generate at least one metadata that corresponds to the captured image; and the at least one available SIMD component is configured to perform the at least one transform in preparation for an analysis of the at least one metadata by at least one core component. The processor also includes the at least one core component configured to: perform the analysis of the at least one metadata to identify at least one region of interest (ROI) within the captured image that is indicated by the at least one metadata to include at least one encoded data marking; and perform a decoding of the at least one ROI identified within the captured image to attempt a decode of the at least one encoded data marking within the at least one ROI.

A decoding system includes: multiple cameras, wherein each camera comprises an image sensor configured to capture an image of multiple captured images, and each camera output a captured image of the multiple captured images as a bitstream of image data comprising grayscale values of pixels in a two-dimensional (2D) array of pixels of the captured image; and a processor coupled to the multiple cameras. The processor includes multiple single-instruction multiple data (SIMD) components, wherein, for each captured image: at least one available SIMD component of the multiple SIMD components is selected to perform at least one transform with the grayscale values of the pixels of at least one portion of the captured image to generate at least one metadata that corresponds to the captured image; and the at least one available SIMD component is configured to perform the at least one transform in preparation for an analysis of the at least one metadata by at least one core component. The processor also includes the at least one core component configured to: perform the analysis of the at least one metadata to identify at least one region of interest (ROI) within the captured image that is indicated by the at least one metadata to include at least one encoded data marking; and perform a decoding of the at least one ROI identified within the captured image to attempt a decode of the at least one encoded data marking within the at least one ROI.

A decoding device includes: storage configured to store image data received from at least one camera, wherein the image data comprises grayscale values of pixels in a two-dimensional (2D) array of pixels in each captured image of multiple captured images that are captured by the at least one camera; and a processor coupled to the storage. The processor includes multiple graphics processing unit (GPU) components, wherein, for each captured image: at least one available GPU component of the multiple GPU components is selected to perform at least one transform with the grayscale values of the pixels of at least one portion of the captured image to generate at least one metadata that corresponds to the captured image; and the at least one available GPU component is configured to perform the at least one transform in preparation for an analysis of the at least one metadata by at least one core component. The processor also includes the at least one core component configured to: perform the analysis of the at least one metadata to identify at least one region of interest (ROI) within the captured image that is indicated by the at least one metadata to include at least one encoded data marking; and perform a decoding of the at least one ROI identified within the captured image to attempt a decode of the at least one encoded data marking within the at least one ROI.

FIGS. 1A, 1B, 1C, 1D, 1E, 1F and 1G, together, depict aspects of a various example embodiments of a decoding system 1000 that may include one or more cameras 100, one or more sensor devices 200 and/or a decoding device 300 coupled by a network 999 (e.g., the cable-based and/or wireless links interconnecting devices). In each of these depicted embodiments of the decoding system 1000, and as will be explained in greater detail, the camera(s) 100, the sensor device(s) 200 and/or the decoding device 300 may cooperate through the network 999 to capture and decode images 880 of surface(s) of objects that carry encoded data markings that encode data, such as indicia and/or digital watermarks. Following such decoding, the decoding device 300 may further transmit the decoded data to another device, such as the depicted example server 900.

Each of the cameras 100 may include an image sensor 110 and a network interface 190 to couple the camera 100 to the network 999. Within each camera 100, the image sensor 110 and the network interface 190 may be communicatively coupled to exchange data therebetween through the exchange of electrical, optical, magnetic and/or other signals through one or more buses and/or other form of interconnect. The image sensor 110 may capture an image within its field of view and provide the captured image to the network interface 190 to transmit to the decoding device 300 via the network 999.

Each sensor device 200, if any are present, may include a skew sensor 210 and a network interface 290 to couple the sensor device 200 to the network 999. Within each sensor device 200, the skew sensor 210 and the network interface 290 may be communicatively coupled to exchange data therebetween through the exchange of electrical, optical, magnetic and/or other signals through one or more buses and/or other form of interconnect. The skew sensor 210 may detect a degree of skew between the plane of a surface of an object carrying one or more encoded data markings and the plane of the images captured by the image sensor 110 of at least one camera 100. The skew sensor 210 may provide an indication of the detected degree of skew to the network interface 290 to transmit to the decoding device 300 via the network 999.

The decoding device 300 may include one or more processors 350, a storage 360 and a network interface 390 to couple the decoding device 300 to the network 999. Each of the processors 350 may incorporate one or more core components 351, and one or more coprocessing components 352. The one or more coprocessing components 352 may include one or more single-instruction multiple-data (SIMD) components 355, and/or one or more graphics processing unit (GPU) components 353. The storage 360 may store image data 130; one or more of metadata 131-1, 131-2 and 131-$w$; one or more of ROI data 132-1, 132-2 and 132-$w$; rectified ROI data 133-$w$; one or more of decoded data 134-1, 134-2 and 134-$w$; parameter data 335 and a control routine 340. Within the decoding device 300, the storage 360 and the network interface 390 may each be communicatively coupled to the one or more processors 350 to exchange data therewith through the exchange of electrical, optical, magnetic and/or other signals through one or more buses and/or other form of interconnect.

The control routine 340 may incorporate a sequence of instructions operative on the one or more processors 350 to implement logic to perform various functions. In so doing, and as will be explained in greater detail, different ones of the one or more core components 351 and/or the one or more coprocessing components 352 within each of the one or more processors 350 may perform different ones of the various functions at different times and/or in parallel. Each of the core component(s) 351, the SIMD component(s) 355 (if present) and the GPU component(s) 353 (if present) may employ different processing architectures supporting different instruction sets to perform different operations.

Each of the one or more core components 351 may form at least part of a central processing unit (CPU) and may support a larger and more complex instruction set than either of the one or more SIMD components 355 and/or the one or more GPU components 353 that may also be present. More specifically, each of the one or more core components 351 may support a wider range of operations with a relatively limited number of operands, which may include a wider range of branching instructions. In contrast, each of the one or more SIMD components 355 and/or each of the one or more GPU components 353 may support a smaller and less complex instruction set than the one or more core components 351, and therefore, may support the performance of a narrower range of operations that are performed simultaneously with sets of multiple operands. Within each of the one or more SIMD components 355, such sets of multiple operands may be supported in side-by-side lanes of SIMD registers that may each be considerably wider than the registers of the one or more core components 351. Within each of the one or more GPU components 353, sets of multiple operands may be retrieved from storage locations within a portion of the storage 360 allocated to the one or more GPU components 353, and each operand of each set of multiple operands may be provided to a separate one of multiple GPU cores within each GPU component 353. The multiple GPU cores within each GPU component 353 may be operated in parallel to perform identical operations with each operand of the multiple operands of a set. However, while the SIMD component(s) 355 and the GPU component(s) may support the performance of a limited set of operations in parallel with multiple operands, the SIMD component(s) 355 and the GPU component(s) 353 may not support branching instructions. Thus, in executing instructions of the control routine 340, the operation and use of the one or more SIMD components 355 and/or the one or more GPU components 353 (whichever may be present within any one particular embodiment) may be controlled by the one or more core components 351.

As part of the decoding device 300 performing its decoding function, at least one core component 351 of a processor 350 of the decoding device 300 may access the storage 360 to retrieve the instructions of the control routine 340 for execution thereby. In so doing, the processor 350 may be caused to operate the network interface 390 to receive a stream of data bits from the one or more cameras 100 conveying images captured by the image sensor 110 of each camera 100, and may operate the storage 360 to store the received data bits of the captured images as the image data 130.

As will be explained in greater detail, in different embodiments and/or at different times, the processor(s) 350 may be used to identify and decode one or more encoded data markings, such as one or more of an one-dimensional (1D) indicia (e.g., a barcode), a two-dimensional (2D) indicia, and a digital watermark that may be carried on a surface of an object, where a portion of which may be included in the image captured by the image sensor 110 of the camera 100, and stored as the image data 130. The selection of which one(s) of a 1D indicia, a 2D indicia and a digital watermark are to be identified and decoded may be based on conditions associated with each individual installation of an embodiment of the decoding system 1000, including what form(s) of indicia and/or digital watermarks are desired to be decoded. By way of example, the decoding of a combination of 2D indicia and digital watermarks may be desired for an installation at a particular warehouse location, while in contrast, the decoding of a combination of 1D indicia and digital watermarks may be desired for an installation at a checkout counter at a retail store location. For sake of clarity and ease of understanding, throughout the text and figures of this application, data structures and executable instructions associated with 1D indicia are given reference numerals that include a "4" suffix; data structures and executable instructions associated with 2D indicia are given reference numerals that include a "-2" suffix; and data structures and executable instructions associated with digital watermarks are given reference numerals that include a "-w" suffix.

Thus, depending on which of 1D indicia, 2D indicia and digital watermarks are to be decoded, one or more coprocessing components 352 may be caused to perform one or more transforms with grayscale values of the pixels of the captured image stored as the image data 130 to derive the metadata 131-1, 131-2 and/or 131-w. More precisely, in embodiments where a 1D indicia is to be decoded, one or more coprocessing components 352 may be caused to perform one or more transforms with the image data 130 to derive the metadata 131-1; in embodiments where a 2D indicia is to be decoded, one or more coprocessing components 352 may be caused to perform one or more transforms with the image data 130 to derive the metadata 131-2; and in embodiments where a digital watermark is to be decoded, one or more coprocessing components 352 may be caused to perform one or more transforms with the image data 130 to derive the metadata 131-w.

One or more core components 351 of the processor(s) 350 may then be caused to analyze the metadata 131-1, 131-2 and/or 131-w to identify at least one region of interest (ROI) for each of a 1D indicia, a 2D indicia and/or a digital watermark, respectively, to be decoded. Where a 1D indicia is to be decoded, if a ROI within which a 1D indicia may be present is identified, then a core component 351 may retrieve the corresponding portion of the captured image, and may store that portion as the ROI data 132-1. Correspondingly, where a 2D indicia is to be decoded, if a ROI within which a 2D indicia may be present is identified, then the corresponding portion of the captured image may be retrieved, and may be stored as the ROI data 132-2. And correspondingly, where a digital watermark is to be decoded, if a ROI within which a digital watermark may be present is identified, then the corresponding portion of the captured image may be retrieved, and may be stored as the ROI data 132-w. As will be explained in greater detail, the manner in which the ROI of a digital watermark may be identified may differ from the manner in which the ROI of either a 1D indicia or a 2D indicia may be identified.

In embodiments in which a digital watermark is to be decoded, one or more coprocessing components 352 may perform homography with the portion of the captured image that is within the ROI (and which may be stored as the ROI data 132-w) to derive a rectified image of the ROI (i.e., a "rectified ROI") in which the skew between the surface of an object carrying the digital watermark and the plane of the portion of captured image within the ROI is eliminated (or at least reduced). In some embodiments, it may be that the decoding of a digital watermark may be less tolerant of such skew than the decoding of either of a 1D indicia or of a 2D indicia. However, it should be noted that, although the use homography to perform rectification is discussed herein as employed in preparation for the decoding of a digital watermark, other embodiments are possible in which homography may, alternatively or additionally, be employed to generate rectified ROI(s) in preparation for the decoding of other forms of encoded data marking, such as a 1D indicia and/or a 2D indicia.

Following at least the identification of a ROI for one or more of a 1D indicia, a 2D indicia and a digital watermark, and/or following a performance of homography with one or more of such ROIs, one or more core components 351 of one or more processors 350 may then attempt to interpret one or more of a 1D indicia, a 2D indicia and/or a digital watermark that may be present within a corresponding one or more ROIs. Where such interpretation is successful, data encoded within a 1D indicia, a 2D indicia and/or a digital watermark may be decoded, and the one or more core components 351 may then operate the network interface 390 to transmit such decoded data to another device (e.g., the depicted server 900) via the network 999.

Turning to FIGS. 1A-D, details are depicted of an example embodiment of the decoding system 1000 that includes a single camera 100 at a single installation site 790, and in which the decoding device 300 incorporates a single processor 350 that incorporates one or more core components 351 along with one or more coprocessing components 352. In such an embodiment, as the single camera 100 captures each image 880 of at least one surface of an object that carries at least one encoded data marking, one or more core components 351 may be caused by their execution of the control routine 340 to assign one or more coprocessing components 352 to perform one or more transforms to generate one or more forms of metadata 131 (e.g., one or more of metadata 131-w, 131-1 and 132-2) in preparation for subsequent analysis by one or more core components 351 to identify the at least one encoded data marking. Alternatively, in alternate embodiments, still another processor (not shown) of the decoding device 300 may perform the task of making such assignments.

Where the single processor 350 incorporates just a single coprocessing component 352 (e.g., just a single SIMD component 355 or just a single GPU component 353), the single coprocessing component 352 may be assigned to perform all of such transforms to generate all of such metadata 131 for all of the types of encoded data markings that are selected to be identified and encoded. This may be done in a manner that is very much as described in the earlier referenced U.S. patent application Ser. No. 15/686,671 entitled "SIMD-BASED SYSTEM FOR MULTIPLE DECODE OF CAPTURED IMAGES" and filed Aug. 25, 2017, which again, is hereby incorporated by reference in its entirety for all purposes. However, where the single processor 350 incorporates multiple coprocessing components 352

(e.g., multiple SIMD components 355 or multiple GPU components 353), different ones of the multiple coprocessing components 352 may be assigned to perform different ones of such transforms, or may be assigned to perform one or more of such transforms for different portions of each captured image 880, or may be assigned to perform one or more of such transforms for the entirety of each different captured image 880. Stated differently, the multiple coprocessing components 352, regardless of what type of coprocessing components they are, may be treated as a "pool" of processing components from which one or more may be selected, as each captured image 880 is received and stored, to each perform one or more transforms on either part or all of that captured image 880.

Figure 1B:
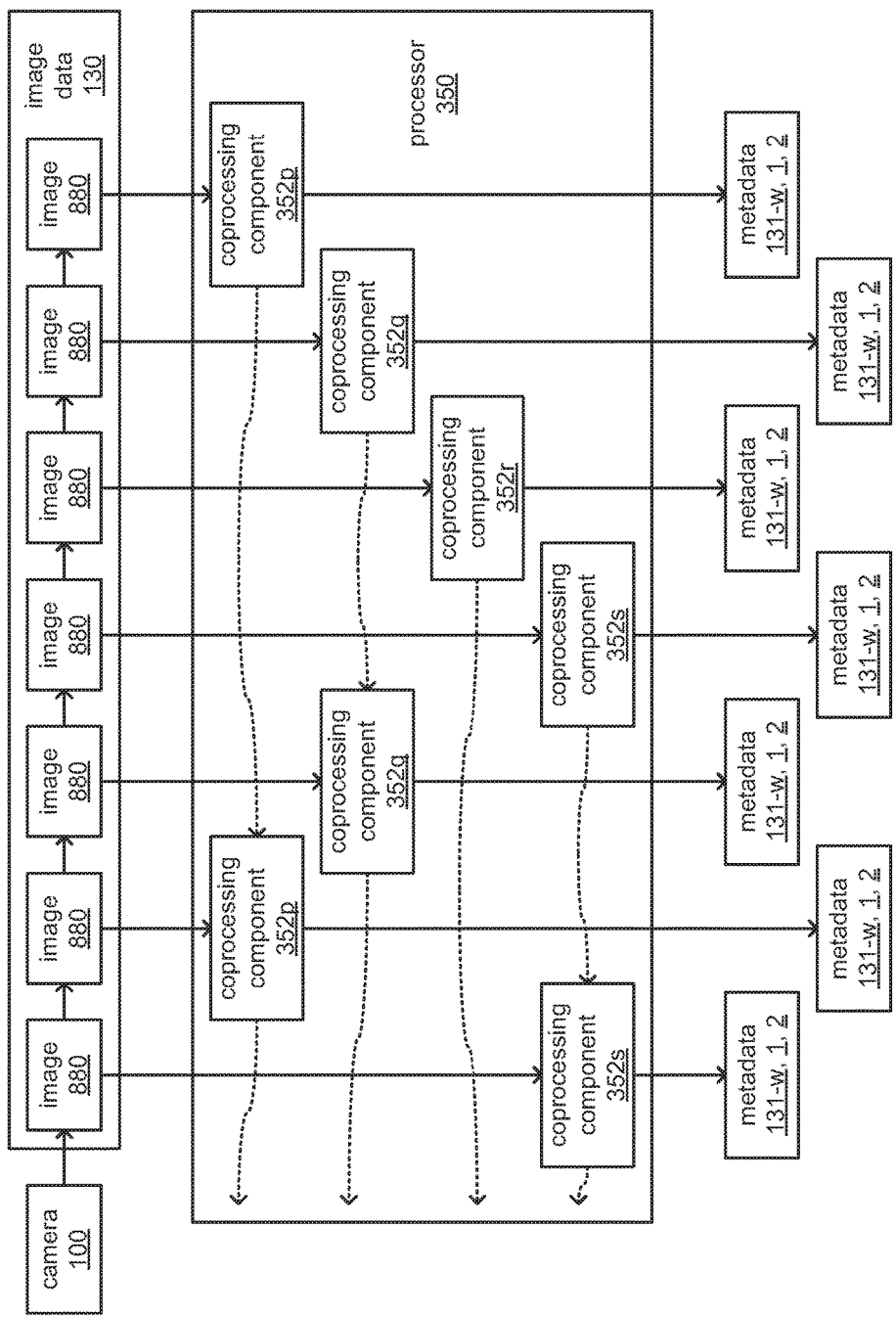

Turning more specifically to FIG. 1B, it may be that, as each captured image 880 is received from the single camera 100 and is stored as part of the image data 130 within the storage 360, a different single one of four coprocessing components 352 (designated 352p, 352q, 352r and 352s) may be assigned to perform all of the one or more transforms for one or more corresponding forms of encoded data marking that may be present within the entirety of each different captured image 880. In some embodiments, the selection of which single one of the four coprocessing components 352p-s is to be assigned to each captured image 880, as each captured image 880 is received and stored, may be made in a "round-robin" manner in which the four coprocessing components are assigned in a circular, repeating order (e.g., 352p, then 352q, then 352r, then 352s, then 352p again, and so on). However, in other embodiments, and as depicted in FIG. 1B, the selection of which single one of the four coprocessing components 352p-s is to be assigned to each captured image 880, as each captured image 880 is received and stored, may be made based on which ones of the four coprocessing components 352p-s is available at the time each captured image 880 is so received and stored.

Figure 1C:
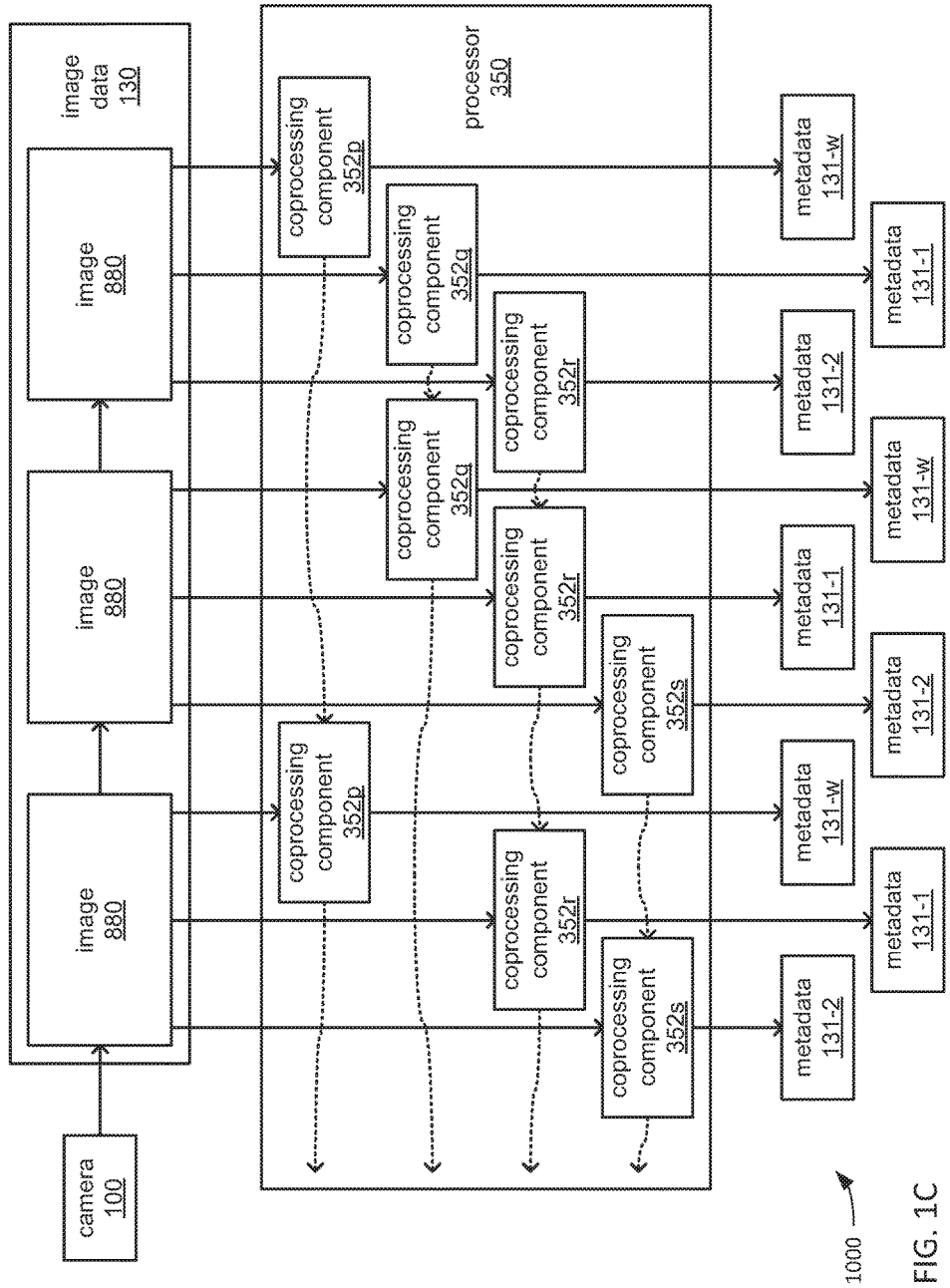

Turning more specifically to FIG. 1C, each captured image 880 may be expected to have multiple different forms of encoded data marking (e.g., at two of a 1D indicia, a 2D indicia, and a digital watermark). Thus, it may be that, as each captured image 880 is received from the single camera 100 and is stored as part of the image data 130 within the storage 360, multiple ones of the four coprocessing components 352 (again designated 352p-s) may be assigned to each perform a different transform for each corresponding form of encoded data marking that may be present within the entirety of each different captured image 880. In other embodiments, and as depicted in FIG. 1C, the selection of which ones of the four coprocessing components 352p-s are to be assigned to each captured image 880, as each captured image 880 is received and stored, may be made based on which ones of the four coprocessing components 352p-s is available at the time each captured image 880 is so received and stored. As depicted, and as will be described in greater detail, the transforms performed to generate instances of the metadata 131-w for use in identifying digital watermarks may take a different amount of time than the transforms performed to generate instances of either of the metadata 131-1 or 131-2 for use in identifying 1D indicia or 2D indicia, respectively. Thus, each coprocessing component 352p, 352q, 352r or 352s that is selected and assigned to perform such a transform for one captured image 880 digital watermarks may not be able to complete its performance of that transform early enough to be available for selection and assignment to perform any transform for the next captured image 880, thereby bringing about the more complex rotation of selection and assignment among the coprocessing components 352p-s, such as what is depicted in FIG. 1C.

Figure 1D:
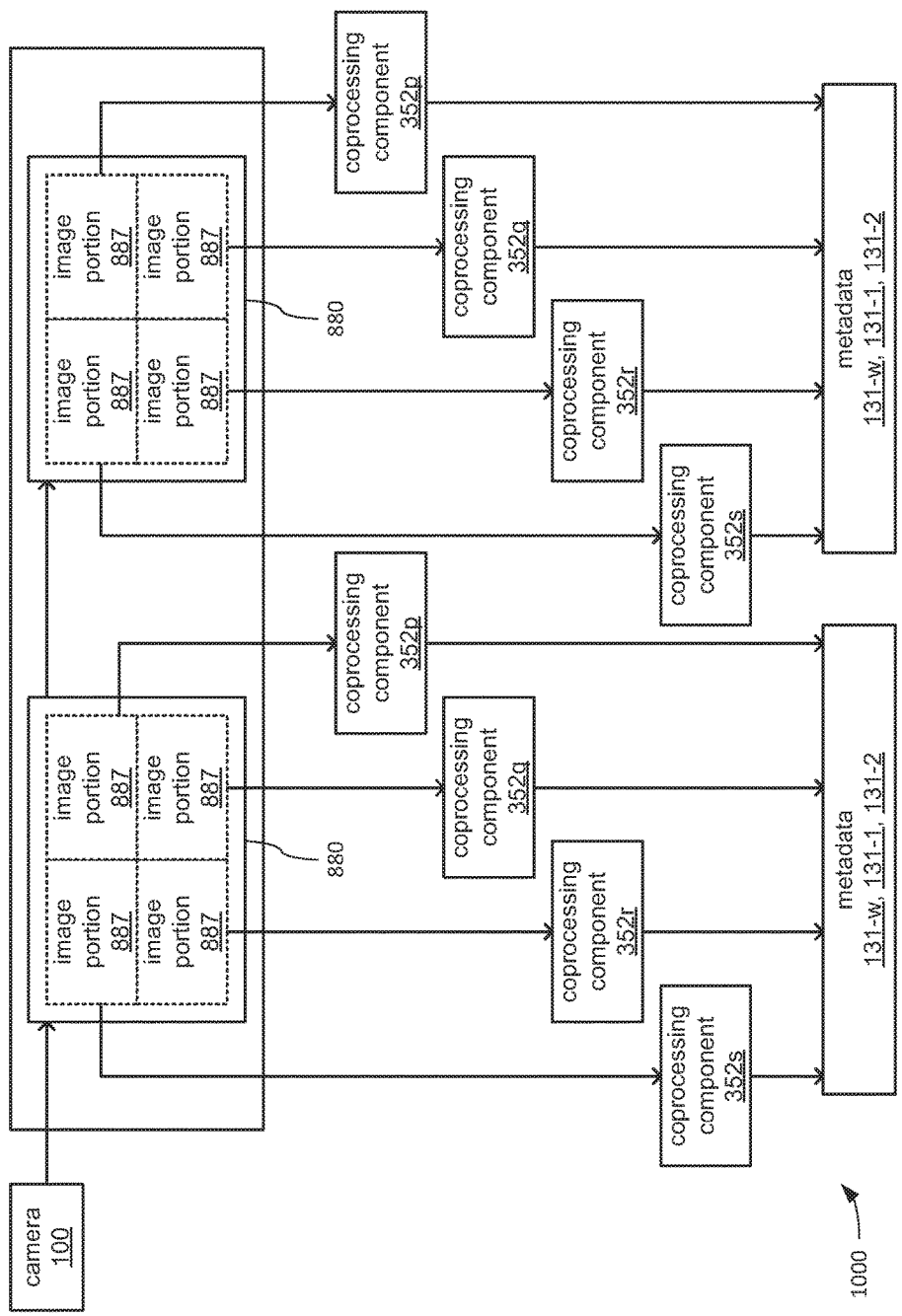

Turning more specifically to FIG. 1D, each captured image 880 may be divided into multiple image portions 887 that are each to be assigned to a different one of the coprocessing components 352p-s. Thus, it may be that, as each captured image 880 is received from the single camera 100 and is stored as part of the image data 130 within the storage 360, multiple ones of the four coprocessing components 352 may be assigned to each perform all of the one or more transforms for one or more corresponding forms of encoded data marking that may be present within a separate one of the multiple image portions 887. In embodiments in which the quantity of image portions 887 into which each captured image 880 is divided either matches the quantity of coprocessing components 352 (as depicted), or is less than the quantity of coprocessing components 352, it may be that each one of the multiple image portions 887 is associated with a particular one of the coprocessing components 352 that is assigned to always perform those one or more transforms within that one image portion 887 across all captured images 880. Alternatively, at least in embodiments in which the quantity of image portions 887 is greater than the quantity of coprocessing components 352, it may be that each one of the multiple image portions 887 is assigned one of the coprocessing components 352 based on which ones of the coprocessing components 352 is available as each captured image 880 is received.

Figure 1E:
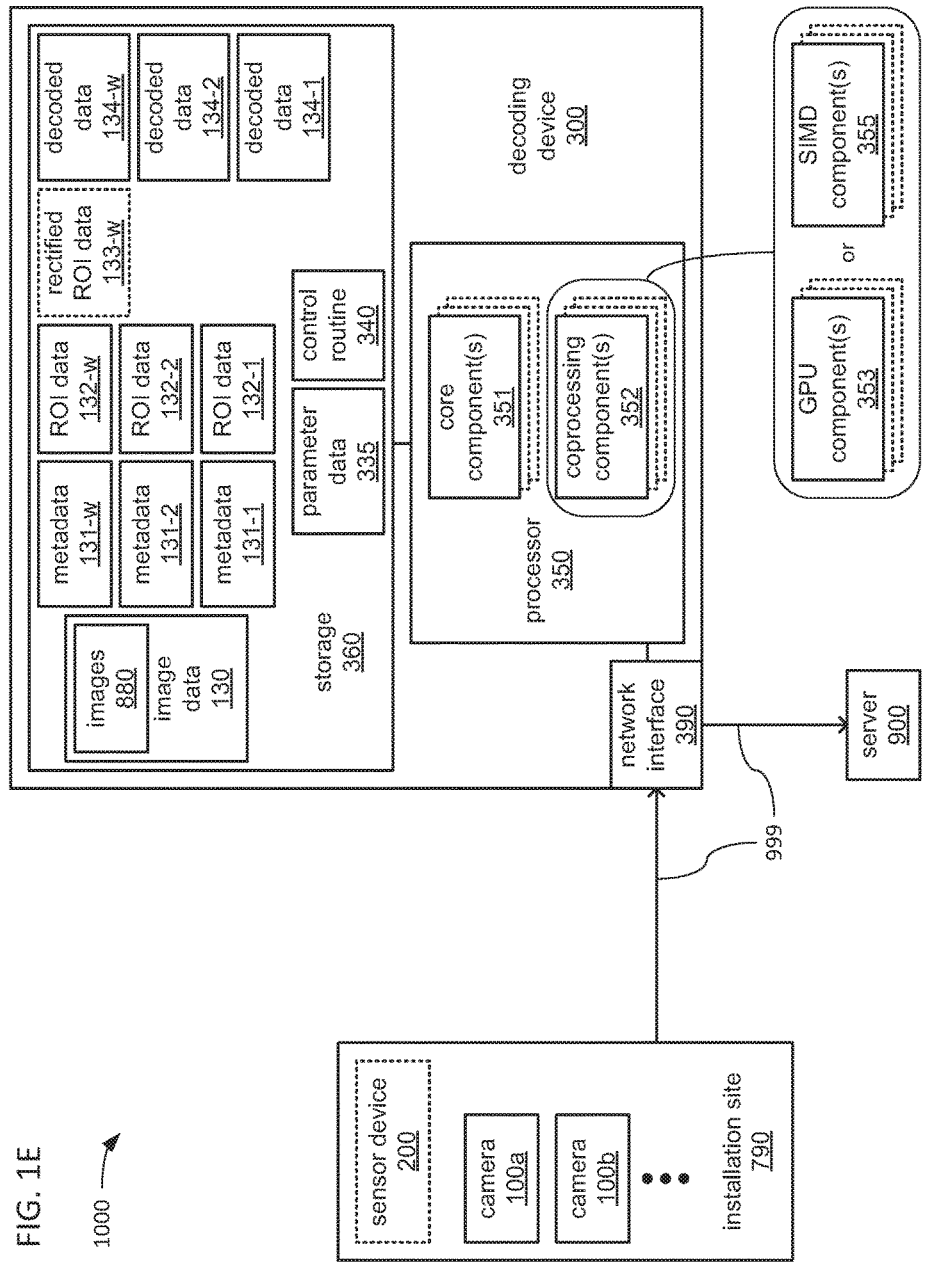

Turning to FIG. 1E, details are depicted of an example embodiment of the decoding system 1000 that includes a multiple cameras 100 (designated cameras 100a, 100b, and so on) at a single installation site 790, and in which the decoding device 300 incorporates a single processor 350 that incorporates one or more core components 351 along with one or more coprocessing components 352. As will be familiar to those skilled in the art, multiple cameras 100 may be installed at a single installation site 790 as an approach to using the different FOVs of the different cameras 100 to capture images 880 of different surfaces of an object in parallel and without requiring that object to be rotated to put its different surfaces within the FOV of a single camera 100.

Figure 1F:
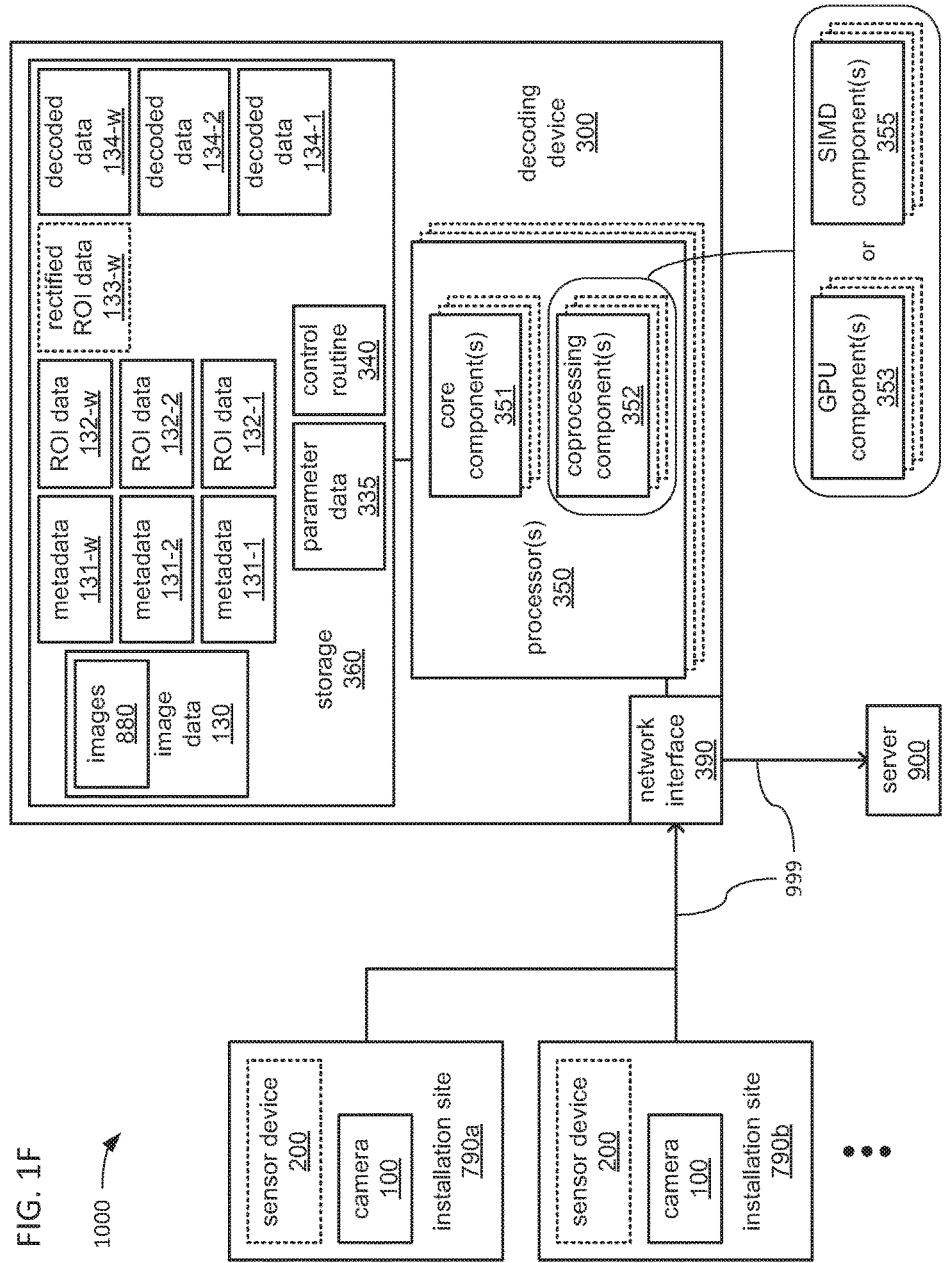

Turning to FIG. 1F, details are depicted of an example embodiment of the decoding system 1000 that includes a multiple cameras 100 (designated cameras 100a, 100b, and so on) that are distributed among multiple installation sites 790 (correspondingly designated installation sites 790a, 790b, and so on), and in which the decoding device 300 may incorporates one or more processors 350 that each incorporate one or more core components 351 along with one or more coprocessing components 352. As will be familiar to those skilled in the art, such distribution of multiple cameras 100 across multiple installation sites 790 may be an approach to using the different FOVs of the different cameras 100 to capture images 880 of surfaces of unrelated objects that may be positioned at entirely unrelated locations (e.g., where the different installation sites 790 correspond to different conveyor belts at an airport or other transportation facility, or correspond to different entrances/exits of a warehouse or distribution facility).

In such embodiments as are depicted in either of FIG. 1E or 1F, as each of the multiple cameras 100 captures an image 880 of at least one surface of an object that may each carry at least one encoded data marking, one or more core components 351 (of one or more processors 350) may be caused by their execution of the control routine 340 to assign one or more coprocessing components 352 (of one or more processors 350) to perform one or more transforms to generate one or more forms of metadata 131 in a manner that may very much resemble what is described above in reference to FIGS. 1A-D. Stated differently, although the captured images 880 may each be received from any of multiple cameras 100, the captured images 880 may be treated, at least for purposes of the performances of one or more transforms, as if they are all part of a single set of captured images 880 such that one or more coprocessing components 352 may be assigned to each captured image 880 in any of the various ways described above in reference to FIG. 1B, 1C or 1D.

Figure 1G:
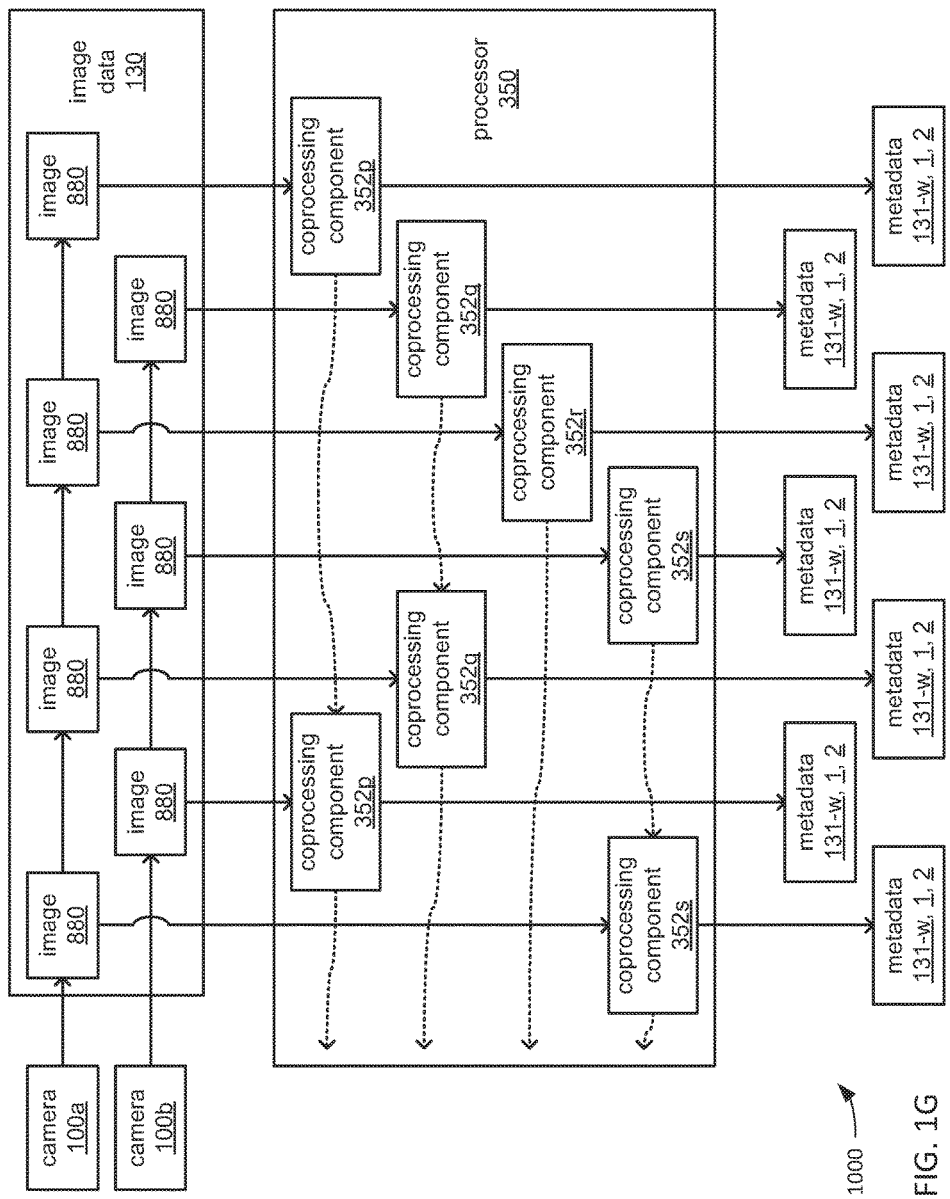

By way of example, FIG. 1G depicts aspects of the selection and assignment of different ones of the coprocessing components 352p-s (whether all provided by a single processor 350 or by multiple processors 350) to each captured image 880 based on which ones of those coprocessing components 352p-s is available at the time each captured image 880 is received and stored. Such an availability-based approach to the distribution of the multiple coprocessing components 352 among the captured images 880 received from multiple cameras 100 very much resembles the availability-based approach to the distribution earlier described in reference to FIG. 1B among the captured images 880 received from a single camera 100. However, and also as described in reference to FIG. 1B, the distribution of the multiple coprocessing components 352 may, instead, be performed in a round-robin manner.

Referring to all of FIGS. 1A-G, the image sensor 110 within each camera 100 may be based on any of a variety of technologies and may employ any of a variety of optical scanning and/or other image capturing techniques to capture an image of an encoded data marking, such as an indicia and/or a digital watermark carried by a portion of an object. More specifically, the image sensor 110 may include any of a variety of light sensing components to effect the capture of an image that may include one or more indicia and/or digital watermarks, including and not limited to, a charge-coupled device (CCD) providing a single row of individual light sensors operated in a manner that sweeps over indicia and/or digital watermarks to perform a scan thereof, or a CCD providing a two-dimensional (2D) array of individual light sensors to capture a 2D image of one or more indicia and/or digital watermarks. In some embodiments, the image sensor 110 and/or another component of each camera 100 may emit various forms of collimated and/or monochromatic light, including light that projects any of a variety of patterns onto a surface of an object that carries one or more encoded data markings. As those skilled in the art will readily recognize, such an emission of light may be to provide sufficient illumination to ensure that an encoded data marking is sufficiently visible to be captured, and/or may provide a visible pattern of markers on a surface of an object, an indicia and/or a digital watermark as a guide to determining the orientation of the indicia and/or digital watermark relative to the image sensor 110 to improve the accuracy with which the data encoded within such encoded data markings is decoded.

The skew sensor 210 within each sensor device 200 that may be present may be based on any of a variety of technologies and/or may employ any of a variety of optical, sonic, magnetic, mechanical and/or other techniques to detect a degree of skew between the plane of a surface of the object that may carry one or more indicia and/or digital watermarks and the plane of the image captured by the image sensor 110 of each camera 100 used in conjunction with the sensor device 200. Alternatively or additionally, the emission of collimated light and/or other technologies incorporated into the image sensor 110 and/or another component of each camera 100 may be employed to detect such a degree of skew.

The object onto which one or more encoded data markings, such as indicia and/or digital watermarks, may be applied may be any of a variety of objects, including and not limited to, a package carrying a shipping label that includes an indicia, or a product for sale within retail packaging on which digital watermark(s) are printed as part of the graphical artwork thereof. The data encoded within such indicia and/or digital watermark(s) may include, and not be limited to, data indicating the addresses of a sender and/or intended recipient of a package, or data providing a universal product code (UPC) that uniquely identifies a product for sale.

Such an indicia may be any of a variety of forms of 1D optically readable indicia (e.g., a barcode) or 2D optically readable indicia (e.g., a QR code), including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; UPC; Aztec Code; Code 1; ColorCode; Color Construct Code; CrontoSign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; and SPARQCode.

The storage 360 may be based on any of a variety of volatile storage technologies, including and are not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storage 360 may be based on any of a variety of non-volatile storage technologies.

Each processor 350 may include any of a wide variety of processors, microcontrollers, gate-array logic devices, etc. that may be incorporate any of a variety of features to enhance speed and/or efficiency of processing operations. Such features may include and are not limited to, multi-threading support per core component 351, multiple processing core components 351, directly integrated memory control functionality, and/or various modes of operation by which speed of throughput and/or level of power consumption may be dynamically altered.

As previously discussed, each processor 350 may include one or more coprocessing components 352, and that such one or more processing components may include one or more SIMD components 355, and/or may include one or more of the GPU components 353. It should be noted that, although the one or more coprocessing components 352 are depicted as separate from the one or more core components 351, at least where the one or more coprocessing components 352 include one or more SIMD components 355, each of such one or more SIMD components 355 may be incorporated into one of the one or more core components 351. It should also be noted that, where the one or more coprocessing components 352 include one or more GPU components 353, each such GPU component may, itself, incorporate one or more SIMD components 355 and/or the functionality thereof.

Each processor 350 may be implemented as a single semiconductor die within a single package. Alternatively, each processor 350 may be implemented as multiple semiconductor dies incorporated into a single package, such as a multi-chip semiconductor package (e.g., a system-on-a-chip, or SOC) in which the multiple semiconductor dies may be interconnected in any of a variety of ways, including and not limited to, conductive wires extending between adjacent semiconductor dies, and/or a substrate formed from multiple layers of conductors separated by intervening layers of insulating material (e.g., a printed circuit board, or PCB) onto which the multiple semiconductor dies may be soldered.

Each of the network interfaces 190, 290 and 390 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, the network interfaces 190, 290 and 390 may each be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

FIGS. 2A and 2B, together, depict aspects of an example of use of an example implementation of the decoding system 1000 of any of FIGS. 1A-G in capturing, identifying and decoding a 1D indicia 775-1 carried on a label or portion 770-1 of an object 700, a 2D indicia 775-2 carried on a label or portion 770-2 of the object 700, and/or a digital watermark 775-w incorporated into an image carried on a label or portion 770-w of the object 700. More specifically, FIG. 2A provides a combination of perspective view and block diagram of an example implementation of the decoding system 1000 that includes at least one camera 100 positioned at an installation 790 to place a location through which the object 700 is moved within its field of view (FOV) 117 and/or the sensor device 200 positioned to enable the detection of the skew of at least one surface of the object 700 relative to the plane of the image captured by the at least one camera 100. FIG. 2B provides a block diagram depicting aspects of the manner in which the digital watermark 775-w may be incorporated into an image carried on the label or portion 770-w of the object 700 so as to be tiled thereon. While this example is introduced with FIGS. 2A and 2B, aspects of the identification and decoding of the 1D indicia 775-1, the 2D indicia 775-2 and/or the digital watermark 775-w are depicted in, and will be further discussed in reference to, other figures herein.

Turning more specifically to FIG. 2A, it should be noted that this depiction of an example of use of an implementation of the decoding system 1000 is but one possible example provided herein for purposes of illustration, and should not be taken as limiting. Stated differently, other uses of other implementations of the decoding system 1000 are possible in which the object 700 may be any of a variety of objects other than a package moved through a location within the FOV 117 of the at least one camera 100, and/or in which the at least one camera 100 may be mounted to a vehicle or other movable platform such that it is the at least one camera 100 that is moved relative to the object 700, instead of the object 700 being moved relative to the at least one camera 100.

Turning more specifically to FIG. 2B, while the object 700 may carry only a single instance of either the 1D indicia 775-1 or the 2D indicia 775-2, the object 700 may carry multiple instances of the digital watermark 775-w incorporated into a single surface-carried image (e.g., the depicted example surface-carried image of a pine tree planted atop a rolling portion of land) on the label or portion 770-w of the object 700. Stated differently, the digital watermark 775-w, may be repeated across the surface of the label or portion 770-w of the object 700 in multiple tiles 771.

Figure 3A:
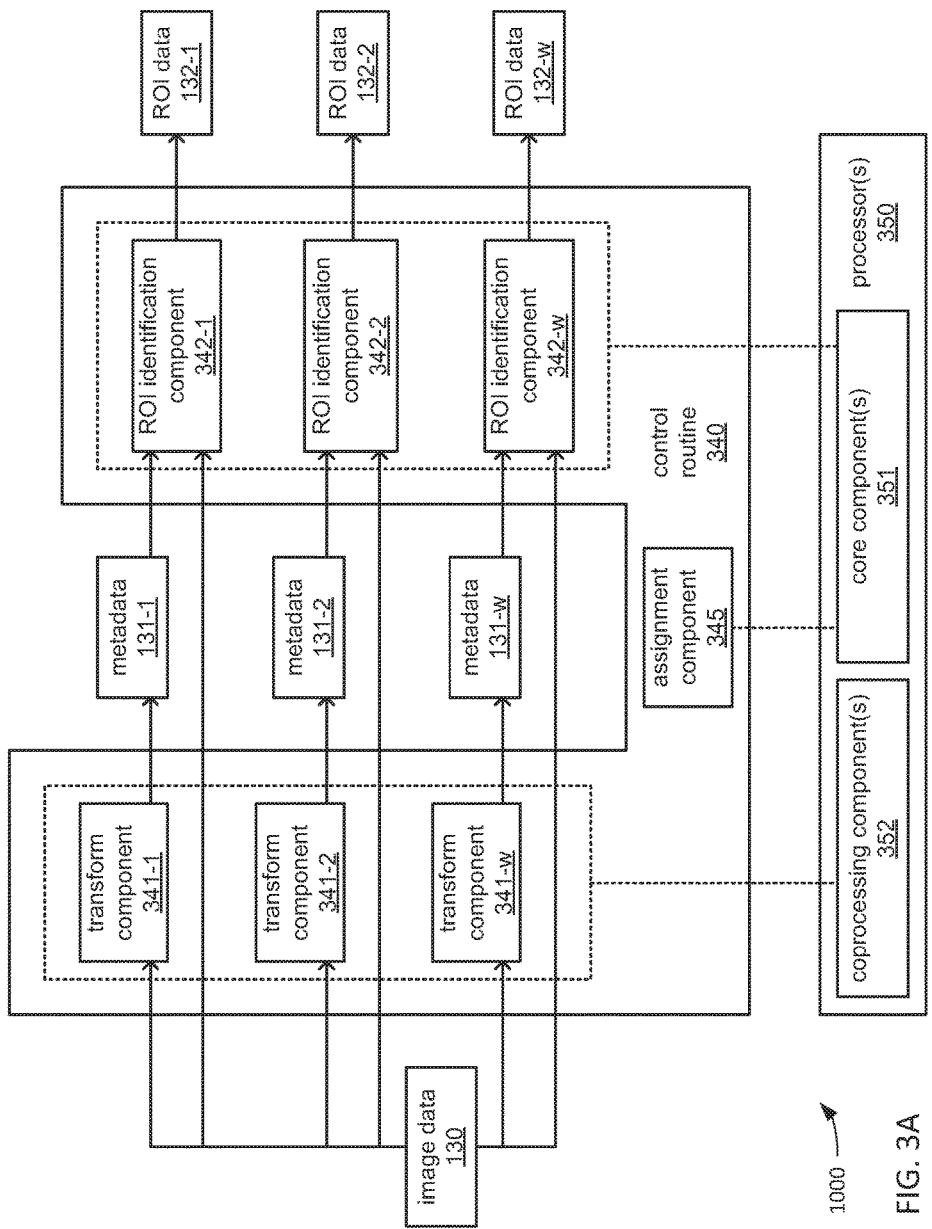
FIGS. 3A and 3B, together, show aspects of a use of parallelism in identification and/or decoding in a decoding device of the system of FIG. 1.
Figure 3B:
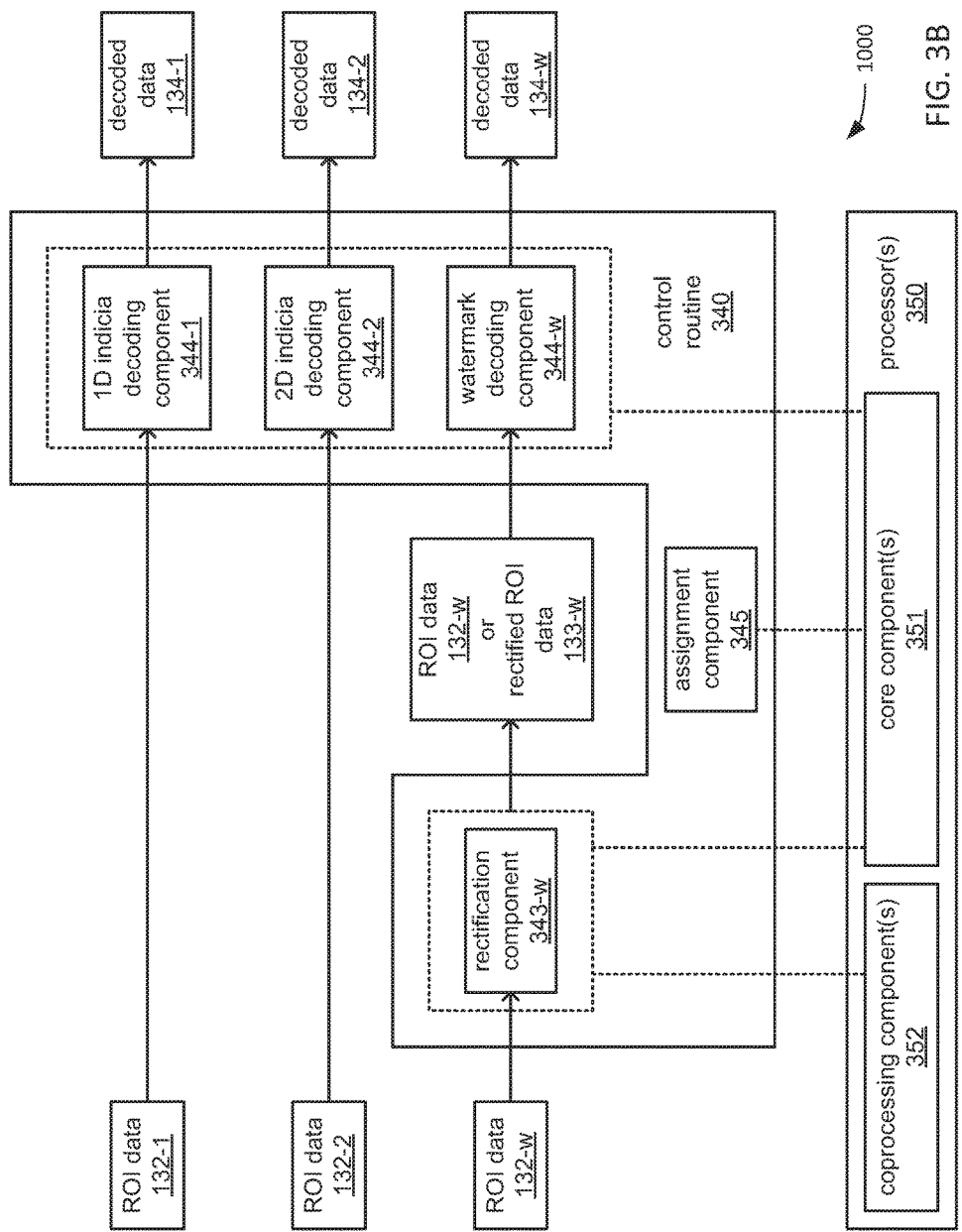

FIGS. 3A and 3B, together, depict aspects in greater detail of an internal architecture of an embodiment of the decoding device 300 of the decoding system 1000, where some degree of parallelism may be used within the decoding device 300 to identify and/or decode the 1D indicia 775-1, the 2D indicia 775-2 and/or the digital watermark 775-w of the example of FIGS. 2A-B. As previously discussed, differing combinations encoded data markings, such as different combinations of indicia and/or digital watermark(s) may be identified and/or decoded in differing implementations of the decoding system 1000. Thus, while FIGS. 3A-B depict an example of the identification and decoding of all three of the 1D indicia 775-1, the 2D indicia 775-2 and the digital watermark 775-w, other example embodiments are possible in which less than all three of these forms of encoded data marking may be identified and decoded.

Turning more specifically to FIG. 3A, one or more coprocessing components 352 of one or more processors 350 may be caused to execute instructions of separate transform components 341-1, 341-2 and/or 341-w to perform differing transforms on grayscale values of the pixels of an image 880 captured by a camera 100 (and stored as the image data 130) to generate the metadata 131-1, 131-2 and/or 131-w, respectively. As indicated in this depiction of separate transform components 341-1, 341-2 and 341-w, in some embodiments, the types of transforms that may be performed in preparation for identifying ROIs within which the 1D indicia 775-1, the 2D indicia 775-2 and the digital watermark 775-w may be present may be different transforms. The selection of one or more transforms to generate metadata to enable identification of ROIs for each of the 1D indicia 775-1, the 2D indicia 775-2 and the digital watermark 775-w may be based on the differing characteristics of each. By way of example, a transform selected to prepare for the identification of a ROI in which a 1D barcode may be present through detection of the pattern of multiple parallel lines of a typical barcode may be undesirably ineffective in preparing for the identification of a ROI in which a 2D QR code may be present, since a QR code would have no such pattern of multiple parallel lines. It should be noted that, in some embodiments, one or more of the transform components 341-1, 341-2 and 341-w may be performed at least partially in parallel as a result of being executed by different ones of the coprocessing components 352, where multiple coprocessing components 352 have been assigned to perform the one or more transforms in any of the approaches discussed above in reference to FIGS. 1A-G.

Following generation of the metadata 131-1, 131-2 and/or 131-w, one or more core components 351 of the one or more processors 350 may be caused to execute instructions of separate ROI identification components 342-1, 342-2 and/or 342-w to analyze metadata 131-1, 131-2 and/or 131-w, respectively, to identify ROI(s). If an ROI is identified through the execution of the ROI identification components

342-1, 342-2 and/or 342-w, then corresponding one(s) of the ROI data 132-1, 132-2 and/or 132-w, respectively, may be generated that each contain at least one portion of the captured image 880 of the image data 130 within the ROI(s). Again, as indicated in this depiction of separate ROI identification components 342-1, 342-2 and 342-w, in some embodiments, the types of analyses performed of metadata to identify ROI(s) may necessarily be based on the different one or more transforms used to generate each of the different ones of the metadata 131-1, 131-2 and 131-w, respectively. It should be noted that, in some embodiments, one or more of the ROI identification components 342-1, 342-2 and 342-w may be performed at least partially in parallel as a result of being executed by different ones of the core components 351, and/or on different threads of execution supported by one or more core components 351.

Turning more specifically to FIG. 3B, one or more coprocessing components 352 may be caused to execute instructions of a rectification component 343-w to perform rectification through use of homography with the portion of the captured image that is stored as the ROI data 132-w to eliminate or reduce the skew between the plane of the label or portion 770-w of the object 700 (referring back to FIGS. 2A-B) and the plane of the image 880 captured by the image sensor 110 of the at least one camera 100. The resulting rectified ROI(s) may be stored as the rectified ROI data 133-w. As previously discussed, it may be that the decoding of the digital watermark 775-w is less tolerant of such skew than the decoding of either of the 1D indicia 775-1 or the 2D indicia 775-2 such that the decoding of the digital watermark 775-w may be more easily impaired by a degree of skew that may have little or no adverse affect on the decoding of either the 1D indicia 775-1 or the 2D indicia 775-2. It is for this reason that there is no specific depiction in FIG. 3B of equivalent rectification components to perform rectification with either of the ROI data 132-1 or 132-2. However, as previously noted, other embodiments are possible in which rectification may be so performed in preparation for the decoding of either the 1D indicia 775-1 or the 2D indicia 772-2, either in lieu of or in addition to, the performance of rectification in preparation for the decoding of the digital watermark 775-w.

As will be explained in greater detail, in some embodiments, one or more core components 351 of one or more processors 350 may also execute instructions of the rectification component 343-w to make a determination of whether one or more of the coprocessing components 352 of one or more processors 350 is to perform rectification. Such a determination may be based on a history of rates of relative success and/or failure in the performance of the decoding of data encoded within digital watermarks for different ROIs that may or may not be rectified ROIs. Alternatively or additionally, such a determination may be based on received indications of a degree of skew (e.g., received from the sensor device 200, see FIG. 1).

Following whatever rectification that may be performed with any of the ROI(s) stored within any of the ROI data 132-1, 132-2 or 132-w, one or more core components 351 of the one or more processors 350 may be caused to execute instructions of the separately depicted 1D indicia decoding component 344-1, 2D indicia decoding component 344-2 and/or watermark decoding component 344-w, to attempt to decode data encoded within the 1D indicia 775-1, the 2D indicia 775-2 and/or the digital watermark 775-w, respectively. If such decoding of the 1D indicia 775-1, the 2D indicia 775-2 and/or the digital watermark 775-w is successful, then corresponding one(s) of the decoded data 134-1, 134-2 and/or 134-w, respectively, may be generated that each contain corresponding decoded data in preparation for transmission to another device (e.g., the server 900, see FIG. 1). In some embodiments, one or more of the decoding components 344-1, 344-2 and 344-w may be performed at least partially in parallel as a result of being executed by different ones of the core components 351, and/or on different threads of execution supported by one or more core components 351.

FIGS. 4A, 4B, 4C and 4D, together, depict aspects of an example of identification and decoding of the 1D indicia 775-1 of FIGS. 2A-B by an implementation of the decoding system 1000 in greater detail. It should also be noted that, despite the depiction of a barcode as the example indicia 775-1 throughout the figures, other embodiments are possible in which the 1D indicia 775-1 may be of a different type.

Figure 4A:
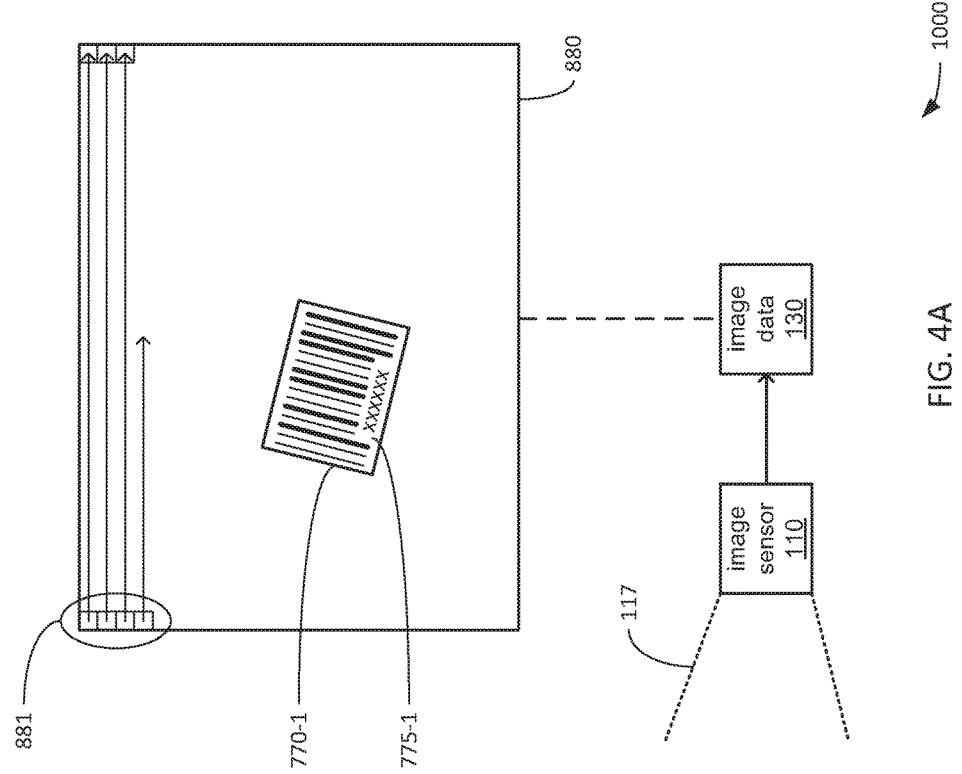
FIGS. 4A, 4B, 4C and 4D, together, show aspects of identifying and decoding a 1D indicia in a captured image.

Turning to FIG. 4A, the image sensor 110 of a camera 100 of the decoding system 1000 may capture an image 880 in its FOV 117 of the label or portion 770-1 of the object 700 (see FIG. 2A) that carries the 1D indicia 775-1 such that the 1D indicia 775-1 may be included in the captured image 880. As will be familiar to those skilled in the art, at least in embodiments in which the image sensor 110 is implemented as a CCD or other type of light sensing device incorporating a 2D array of light sensing elements, the image sensor 110 may output a serial bitstream of values indicating the grayscale levels detected by separate ones of the light sensing elements of the pixels 881 of the captured image 880. As depicted, the order in which those grayscale values in the serial bitstream are output by the image sensor 110 may follow a left-to-right raster scan order within each horizontal row of pixels 881 of the captured image 880, starting with the top row and progressing row-by-row from top-to-bottom of the captured image 880.

In some embodiments, the decoding system 1000 may be configured to trigger the camera 100 to capture an image of the object 700 in response to placement of the object 700 within its FOV 117. Thus, there may be only the one captured image 880 captured by the image sensor 110 to be processed. Such triggering may be based on the output of a sensor (not shown) that detects the proximity of the object 700, and that is monitored by the decoding device 300, which may transmit a command to the camera 100 via the network 999 to trigger the capture of the single image 880. Alternatively, in other embodiments, the decoding system 1000 may be configured to cause the camera 100 to recurringly capture images 880 on a timed basis, such as at selected frame rate. Thus, at a recurring interval of time, the image sensor 110 of the camera 100 would capture a new image 880 to be processed, where each such image 880 may or may not include an image of an object 700 that carries any indicia, whatsoever.

Regardless of whether the image sensor 110 captures only the single captured image 880 of the object 700, or multiple images 880 in a succession in which only a subset may include an image of the object 700, one or more core components 351 of one or more processors 350 may store the bitstream received from the sensor 110 of the captured image(s) 880 as the image data 130 within the storage 360, as was depicted in FIGS. 1A-G. More precisely, the grayscale values of the pixels 881 of the captured image(s) 880 may be stored by as the image data 130.

In some embodiments, the image sensor 110 of one or more cameras 100 may be a monochrome image sensor capable of capturing monochromatic images such that there is only a single grayscale value for each pixel 881. In such embodiments, each of the grayscale values may be a byte-wide (i.e., 8-bit) value that specifies an intensity level of a separate one of the pixels 881 (although grayscale values of greater or lesser bit width may also be used). However, in other embodiments, the image sensor 110 of one or more cameras 100 may be a color image sensor capable of capturing color images such that there may be multiple values for each pixel 881, including one or more grayscale values for each pixel 881. More precisely, in such other embodiments, a color space encoding scheme may be used in which the color of each pixel 881 is specified with multiple grayscale values that each specify a relative level of intensity of a different color component of the color, such as and not limited to, red-green-blue (RGB) or cyan-magenta-yellow-black (CMYK). RGB color space encoding often entails the allocation of 8, 12, 16, 24 or 32 bits per pixel to store the three grayscale values for the red, green and blue intensities. Alternatively, a color space encoding scheme may be used in which the color of each pixel 881 is specified with a single grayscale value that specifies an intensity level accompanied by one or more chrominance values that specify a color that is mapped to the one or more chrominance values, such as and not limited to, luminance-chrominance (YUV). Therefore, as used herein, the term "grayscale value" is intended to denote the single value specifying the level of intensity of either a single monochromatic pixel 881 or a single color pixel 881, or is intended to denote one of the multiple grayscale values specifying the level of intensity of a color component of one of the color components that specify the color of a single pixel 881.

Figure 4B:
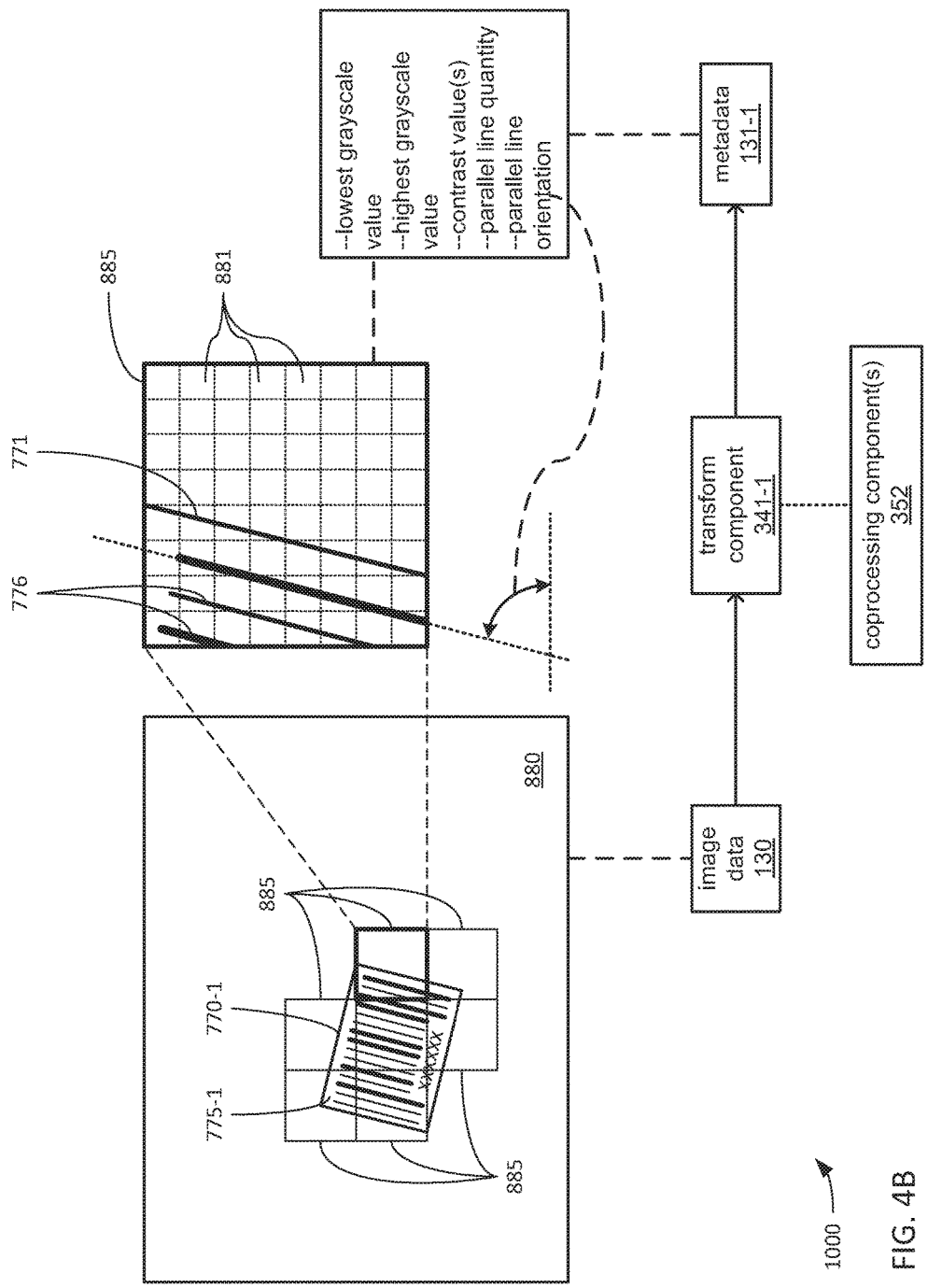

Turning to FIG. 4B, as previously discussed, one or more coprocessing components 352 of one or more processors 350 may execute instructions of the transform component 341-1, thereby causing the one or more coprocessing components 352 to perform one or more transforms to generate the metadata 131-1 in preparation for subsequent processing to identify one or more ROIs within the captured image 880 in which the 1D indicia 775-1 may be present. In so doing, the one or more coprocessing components 352 may be caused to divide the captured image 880 into multiple tiles 885 (of which only a few are shown for sake of clarity). Each tile 885 may be defined by a 2D array of the pixels 881 of the captured image 880 (e.g., an 8×8 array, a 16×16 array, etc.). For each one of the tiles 885, a separate portion of one or more SIMD registers of a SIMD component 355, or a separate set of one or more GPU cores of a GPU component 353, may be used to perform a transform with the grayscale values retrieved from the image data 130 for each of the pixels 881 within each tile 885 to derive corresponding metadata data values for each tile 885 that may be stored as the metadata 131-1.

As previously discussed, the image sensor 110 may output a serial bitstream of grayscale values organized in horizontal raster scan order starting with the topmost horizontal row and proceeding downward to the bottommost horizontal row. In such embodiments, advantage may be taken of this ordering of grayscale values to perform the S-transform on whole horizontal rows of the tiles 885 at a time, as the image sensor 110 provides grayscale values for a sufficient number of horizontal rows of pixels 881 to enable at least the commencement of performance of the S-transform with each successive horizontal row of tiles 885. More specifically, advantage may be taken of this ordering to utilize one or more SIMD registers of a SIMD component 355, or multiple GPU cores of a GPU component 353, to perform the S-transform simultaneously within all of the tiles 885 within whole horizontal rows of the tiles 885, starting with the topmost row of the tiles 885.

In some embodiments, the transform that is performed may be the Saporetti transform (S-transform) described in U.S. Pat. No. 6,047,893 issued Apr. 11, 2000, to Claudio Saporetti, the disclosure of which is incorporated herein by reference for all purposes. Among the metadata values that may be generated for a tile 885 from a performance of the S-transform therewith may be metadata values indicating the highest and lowest grayscale values found among the pixels 881 within the tile 885, the greatest contrast in grayscale values found within the tile 885, a quantity of parallel lines found within the tile 885 (if any), and/or an orientation angle of the parallel lines (if any are found). The S-transform may be implemented in any of a variety of ways providing a greater or lesser degree of accuracy, and may be implemented in any of a variety of ways selected to ease the use of one or more SIMD registers of a SIMD component 355, or multiple GPU cores of a GPU component 353, to perform the S-transform.

However, it should be noted that other embodiments are possible in which one or more other transforms and/or other types of analyses may be performed with the grayscale values of the pixels 881 within each tile 885 to generate metadata values for each tile 885. Such other transforms and/or analyses may be performed either in lieu of or in addition to the S-transform. By way of example, in some embodiments, one or more filters and/or spatial transforms may be utilized to condition the grayscale values of the pixels 881 prior to the performance of the S-transform.

Figure 5C:
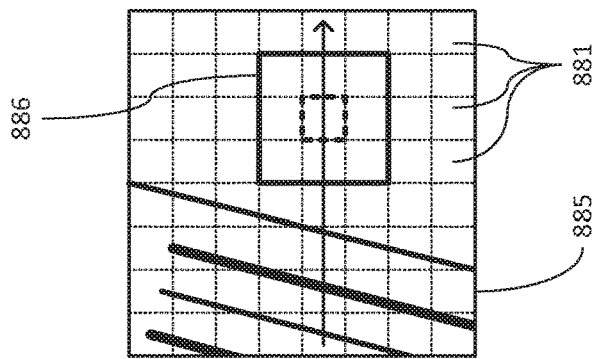
FIGS. 5A, 5B and 5C, together, show aspects of convolving a stencil to perform a transform.
Figure 5B:
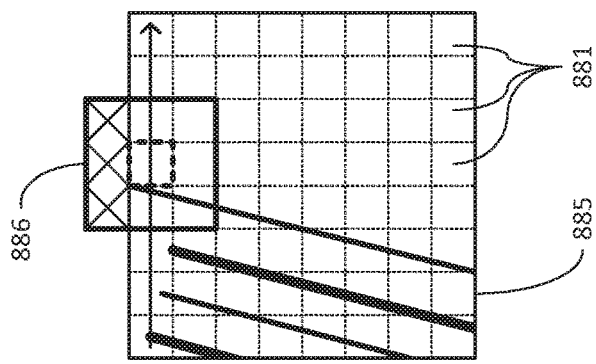
Figure 5A:
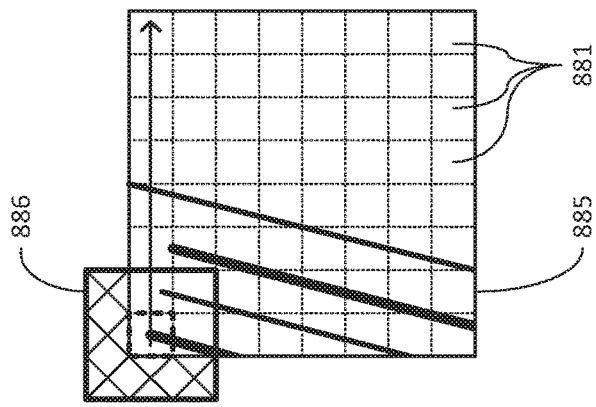
Figure 6C:
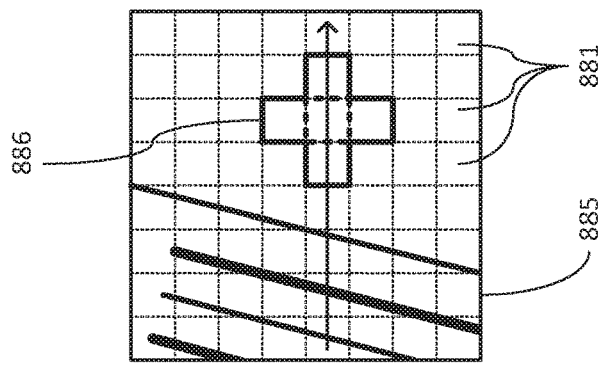
FIGS. 6A, 6B and 6C, together, show aspects of convolving an alternate stencil to perform a transform.
Figure 6B:
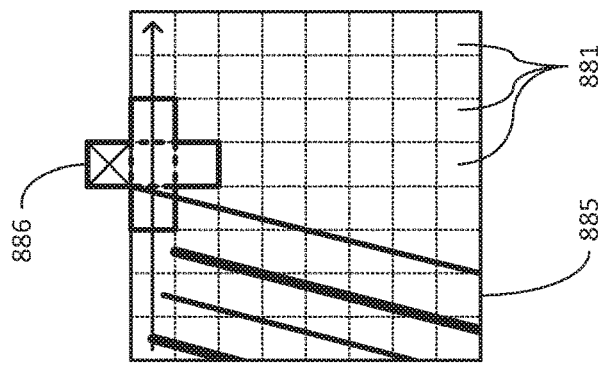
Figure 6A:
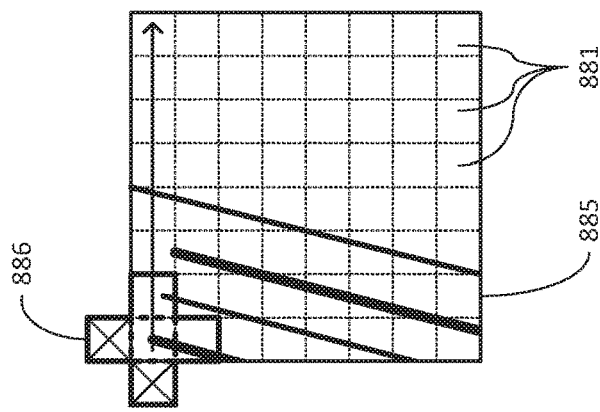

In performing at least the S-transform, a stencil may be convolved about the 2D array of pixels 881 within each of the tiles 885. FIGS. 5A, 5B and 5C, together, depict an example of convolving a square-shaped form of a stencil 886 made up of a 3×3 array of pixels 881. FIGS. 6A, 6B and 6C, together, depict an example of convolving a cross-shaped form of the stencil 886 made up of less than all of a 3×3 array of pixels 881. As will be familiar to those skilled in the art, any of a variety of techniques may be employed to address the occurrences of part of the stencil 886 (regardless of its shape) extending beyond the boundaries of the tile 885 about which it is convolved such that pixels 881 of one or more neighboring tiles 885 may be covered by the stencil 886 and/or occurrences of part of the stencil 886 extending beyond the boundaries of the captured image 880 such that part of the stencil 886 extends to where there are no pixels 881, at all. As depicted, in such instances, no grayscale values that may be present within the part of the stencil 886 that extends beyond the boundaries of the tile 885 and/or beyond the boundaries of the captured image 880 are included in the S-transform calculations associated with the stencil 886.

Returning to FIG. 4B, as depicted within one of the tiles 885 for which an enlarged view is provided, the performance of the S-transform with the grayscale values of the pixels 881 thereof may beget a metadata value indicating either three or four parallel lines depending on whether the depicted border of the label or portion 770-1 of the object 700 on which the lines 776 of the depicted barcode example of the 1D indicia 775-1 are printed.

Figure 4C:
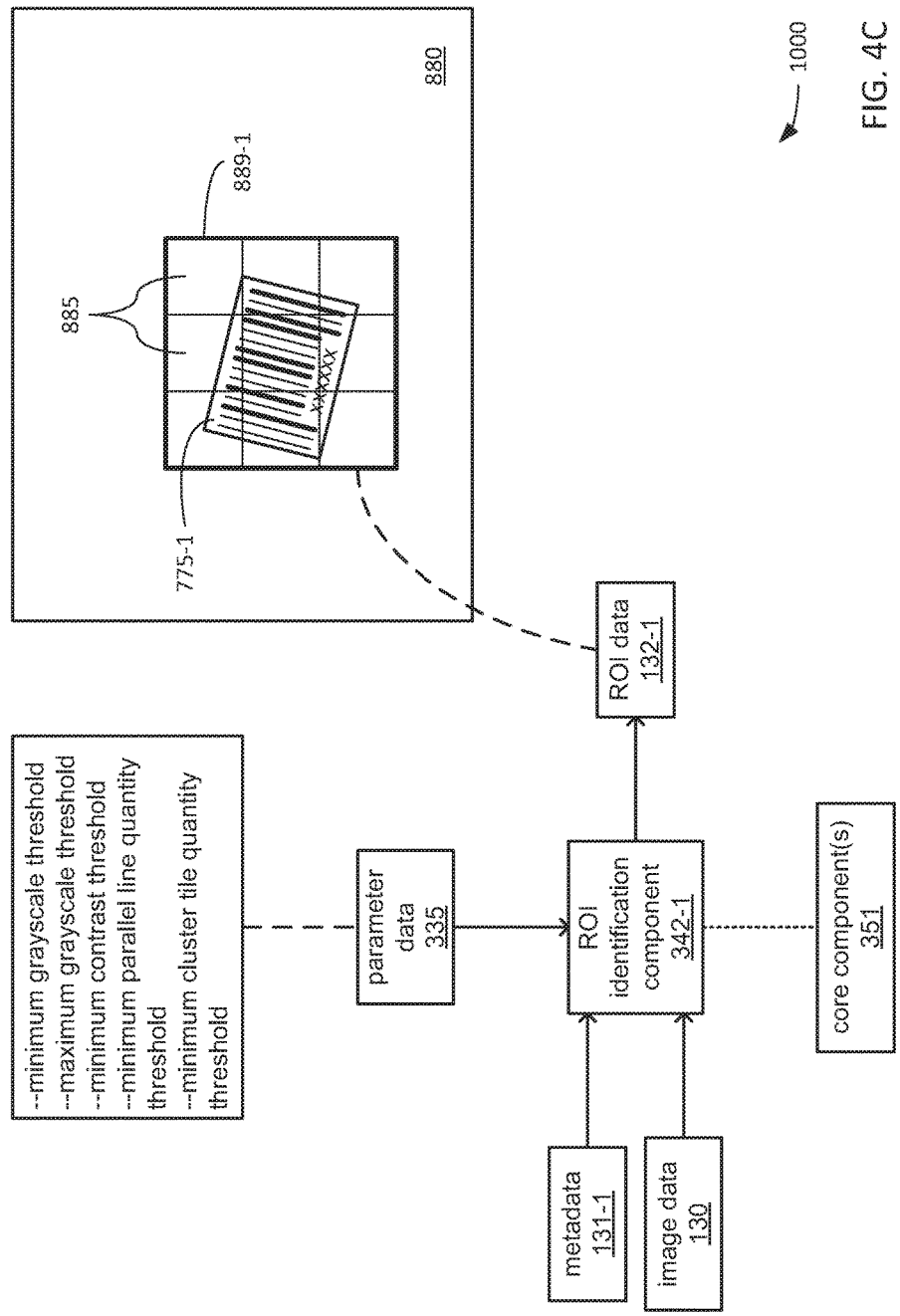

Turning more specifically to FIG. 4C, as previously discussed, one or more core components 351 of one or more processors 350 may be caused to execute instructions of the ROI identification component 342-1 to perform an analysis of one or more metadata values within the metadata 131-1 for each tile 885 to identify a cluster of adjacent tiles 885 within the captured image 880 that may include an image of the 1D indicia 775-1. Thus, as is about to be explained, the identification of a ROI 889-1 in which the 1D indicia 775-1 may be present may entail the identification of a cluster of adjacent tiles 885 that are found to have characteristics suggestive of including the 1D indicia, such that the cluster of adjacent tiles 885 serve to define at least a portion of such an identified ROI 889-1.

In some embodiments, such an analysis may entail a comparison of metadata values, such as highest and lowest grayscale values, highest contrast value, quantity of parallel lines and/or angle of orientation of those parallel lines to corresponding ones of various threshold values included within the parameter data 335. Such threshold values may include minimum and/or maximum grayscale thresholds, a minimum contrast threshold and/or a minimum quantity of parallel lines. Thus, in performing such an analysis, per tile 885, the one or more core components 351 may be caused to compare the indications in the metadata 131-1 for the lowest and highest grayscale values, the highest contrast value and/or the quantity of lines associated with each of the tiles 885 to such thresholds to determine whether such characteristics of the tile 885 are consistent with that tile 885 including a portion of the 1D indicia 775-1.

Upon identifying ones of the tiles 885 having characteristics consistent with including a portion of the indicia 775-1, the one or more core components 351 may then be caused to identify one or more clusters of adjacent ones of such tiles 885 where the quantity of such adjacent tiles 885 meets a minimum adjacent tile quantity threshold specified in the parameter data 335. Additionally, the one or more core components 351 may be caused to compare the metadata values indicating an angle of orientation of the parallel lines found within each of the tiles 885 of each such cluster to determine whether their angles of orientation match. By way of example, for a barcode such as the example 1D indicia 775-1, the lines 776 are parallel to each other, and therefore, should have the same angle of orientation across the all of the tiles 885 into which they extend. However, if the indicated angle of orientation differs between two adjacent tiles 885, then the angles of orientation may be presumed to belong to unrelated sets of parallel lines such that the lines 776 that may be present within one of the two adjacent tiles 885 may be presumed to not extend into the other of the two adjacent tiles 885.

In various embodiments, the thresholds specified in the parameter data 335 may be based on experimentation with examples of indicia having the characteristics expected to be encountered in the indicia that are meant to be identified and decoded by the decoding system 1000. As will be familiar to those skilled in the art, different types of indicia may have differing densities of lines, blocks and/or other graphical elements. Also, the expected size of such indicia and the distance that a camera 100 is expected to be from such indicia must be taken into account. As a result, the parameter data 335 may include a set of initial values for such thresholds to be used as a starting point in the performance of various tests of an installation of the decoding system 1000 under the conditions in which it is to be used to adjust the threshold values. Such testing may also be required to adjust an initial value that may be included within the parameter data 335 for a minimum quantity of adjacent tiles 885 for a cluster. As with one or more of the other threshold values, the expected size of the 1D indicia 775-1 and the expected distance of a camera 100 from the 1D indicia 775-1 may affect the minimum quantity of adjacent tiles 885 for a cluster.

Upon identifying a cluster of adjacent tiles 885 that is of sufficient quantity among the tiles 885 of the captured image 880, the one or more core components 351 may be caused by execution of the ROI identification component 342-1 to retrieve the grayscale values within the image data 130 for the pixels 881 of the portion of the captured image 880 that is included within an ROI 889-1 that may include the 1D indicia 775-1 based on the identified cluster. The one or more core components 351 may then be caused to store those grayscale values of the pixels 881 within the ROI 889-1 as the ROI data 132-1.

In some embodiments, the one or more core components 351 may be caused to increase the size of the ROI 889-1 beyond the leftmost, rightmost, topmost and bottommost boundaries of the identified cluster of tiles 885 to ensure that all of the 1D indicia 775-1 is included within the ROI 889-1. Such increasing of the size of the ROI 889-1 may be deemed desirable to counteract situations in which a small enough portion of the 1D indicia 775-1 is included within a tile 885 that one or more of the metadata values generated by the performance of the transform for that tile 885 do not meet one or more of the thresholds. By way of example, if too small a quantity of the lines 776 of the 1D indicia 775-1 fall within one of the tiles 885, then the resulting metadata value specifying the quantity of parallel lines 776 within that tile 885 may be too low.

Figure 4D:
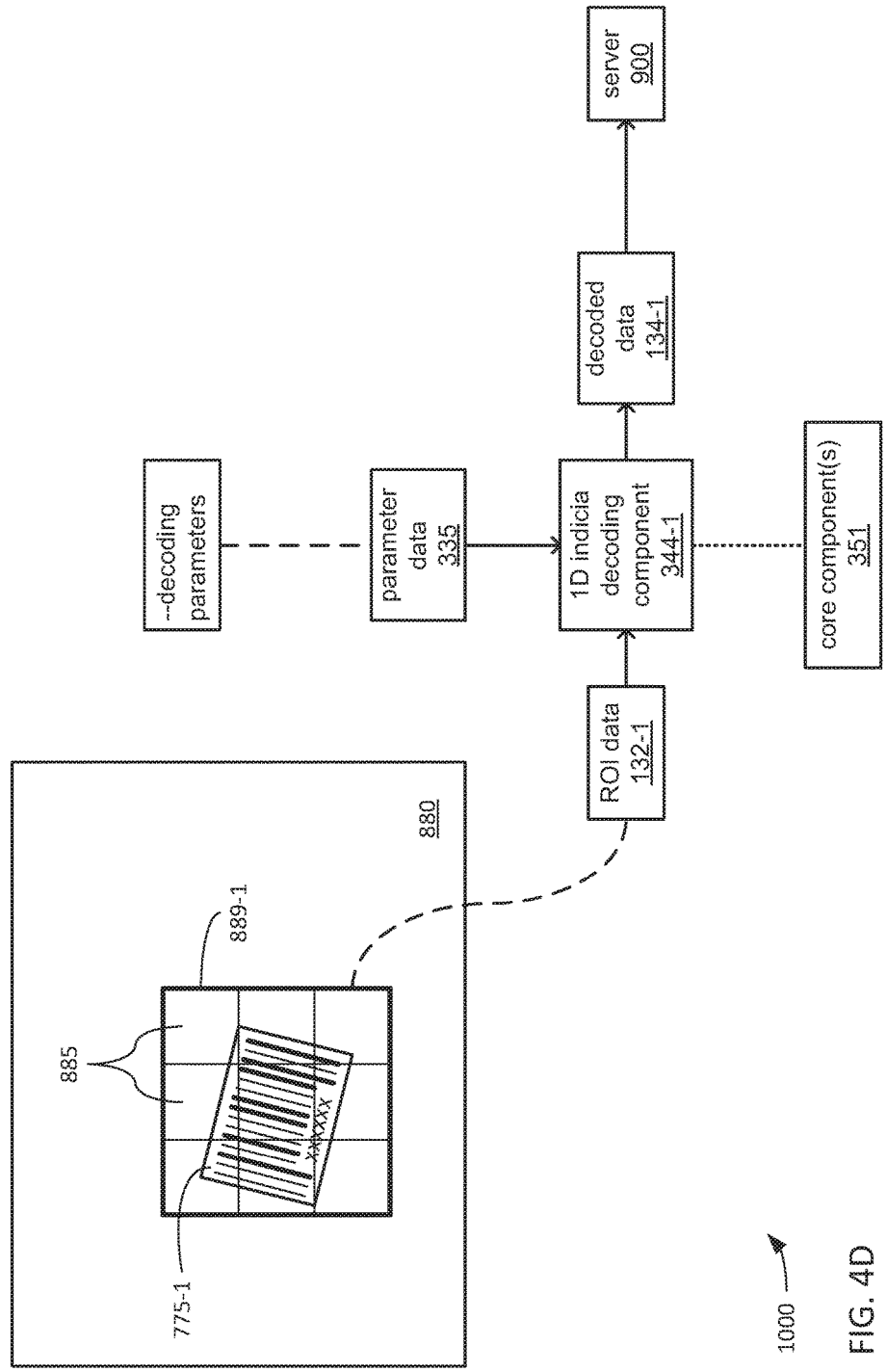

Turning to FIG. 4D, as previously discussed, one or more core components 351 of the processor 350 may be caused to execute instructions of the 1D indicia decoding component 344-1 to perform an interpretation of the 1D indicia 775-1 to decode the data that is encoded therein. If such decoding is successful, then the one or more core components 351 may store that data as the decoded data 134-1. In interpreting the 1D indicia 775-1 within the ROI 889-1, the one or more core components 351 may employ various decoding parameters that may also be stored as part of the parameter data 335. Such decoding parameters may include one or more sets of rules by which an indicia that adheres to one or more standards for 1D indicia may be interpreted. Following the interpretation of the 1D indicia 775-1 and the storage of the decoded data 134-1 therefrom, the one or more core components 351 may be caused to operate the network interface 390 to transmit the decoded data 134-1 to the another device via the network 999, such as the depicted server 900.

FIGS. 7A, 7B, 7C, 7D and 7E, together, depict aspects of an example of identification and decoding of the digital watermark 775-*w* of FIGS. 2A-B by an implementation of the decoding system 1000 in greater detail.

Figure 7A:
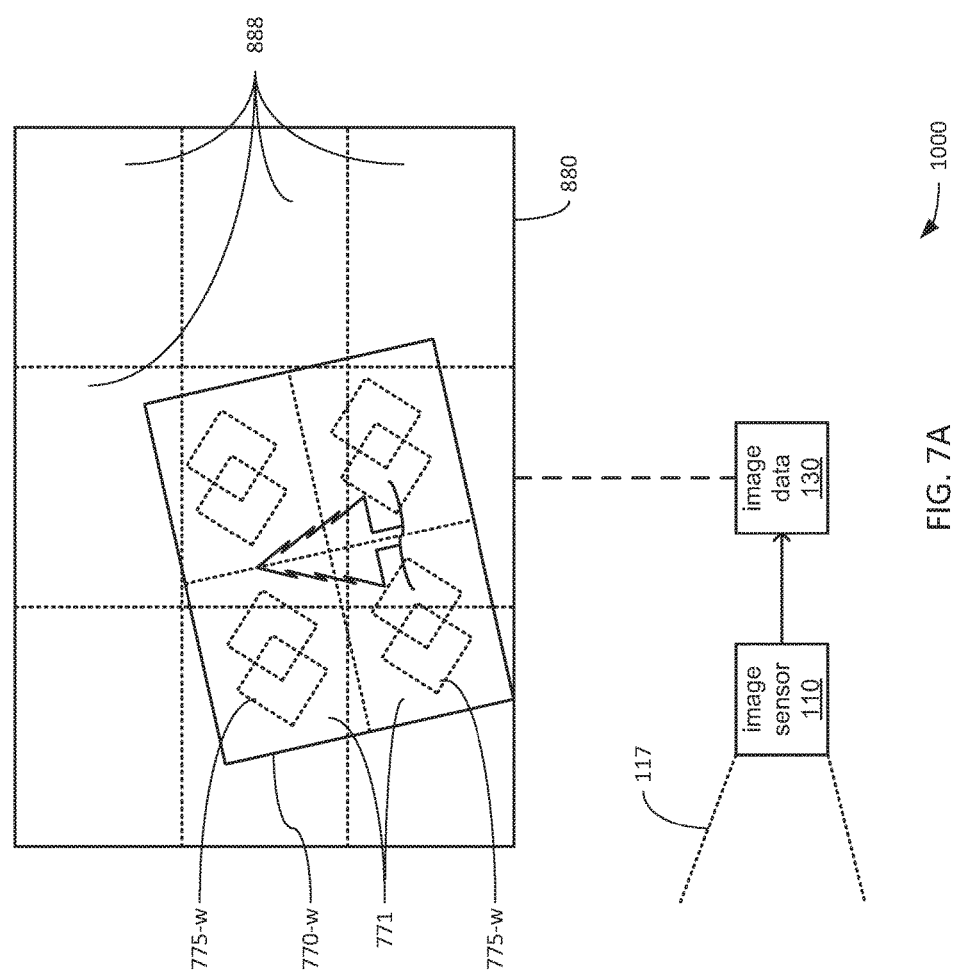

Turning to FIG. 7A, the image sensor 110 of a camera 100 of the decoding system 1000 may capture an image 880 in its FOV 117 of the label or portion 770-*w* of the object 700 (see FIGS. 2A-B) that carries the digital watermark 775-*w* such that the digital watermark 775-*w* may be included in the captured image 880. Again, one or more core components 351 of one or more processors 350 may store the bits received from the image sensor 110 of the captured image 880 as the image data 130 within the storage 360.

Figure 7B:
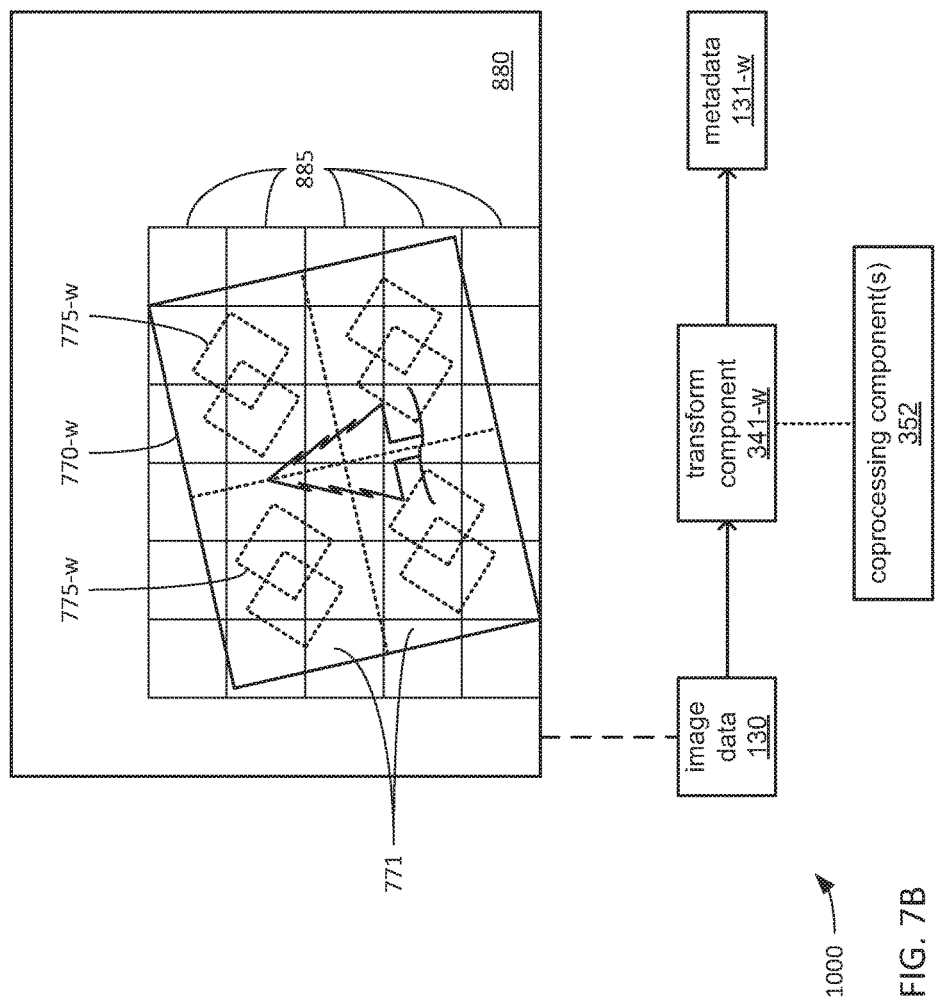
Figure 8B:
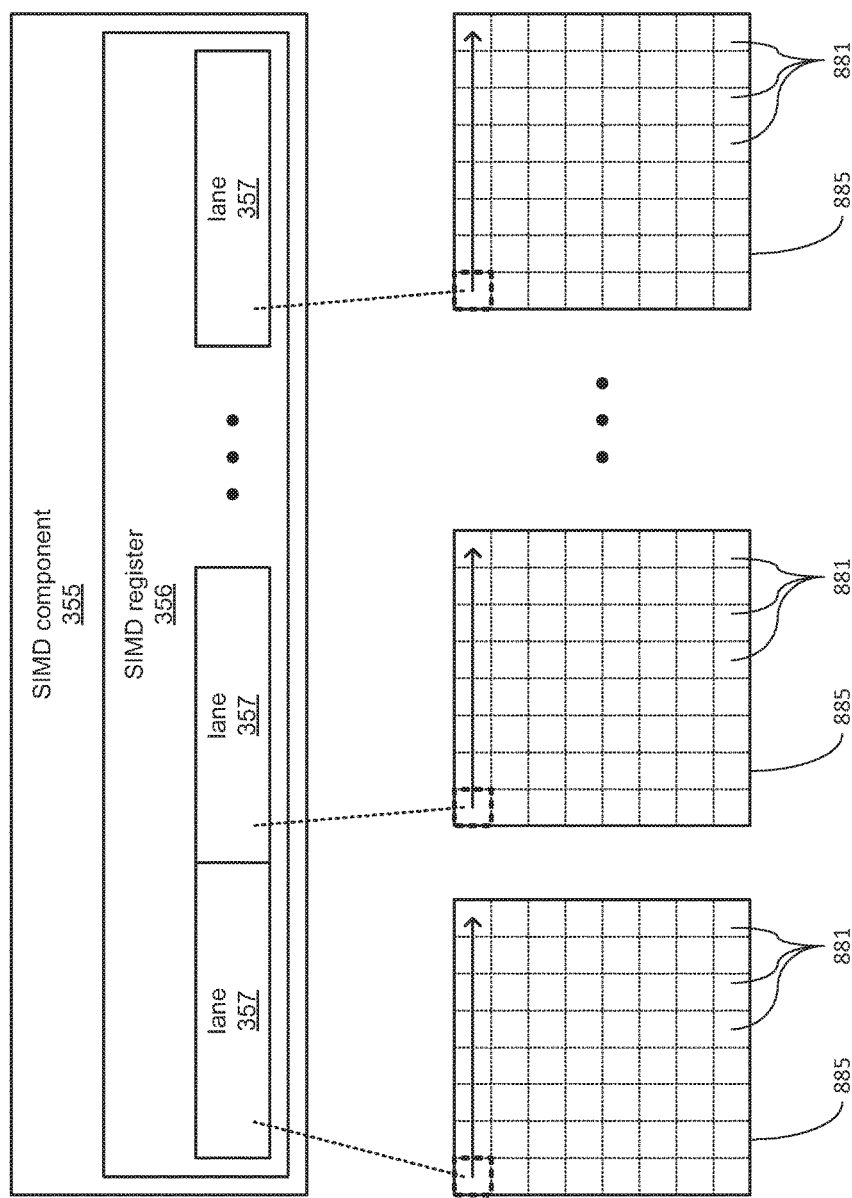
Figure 8C:
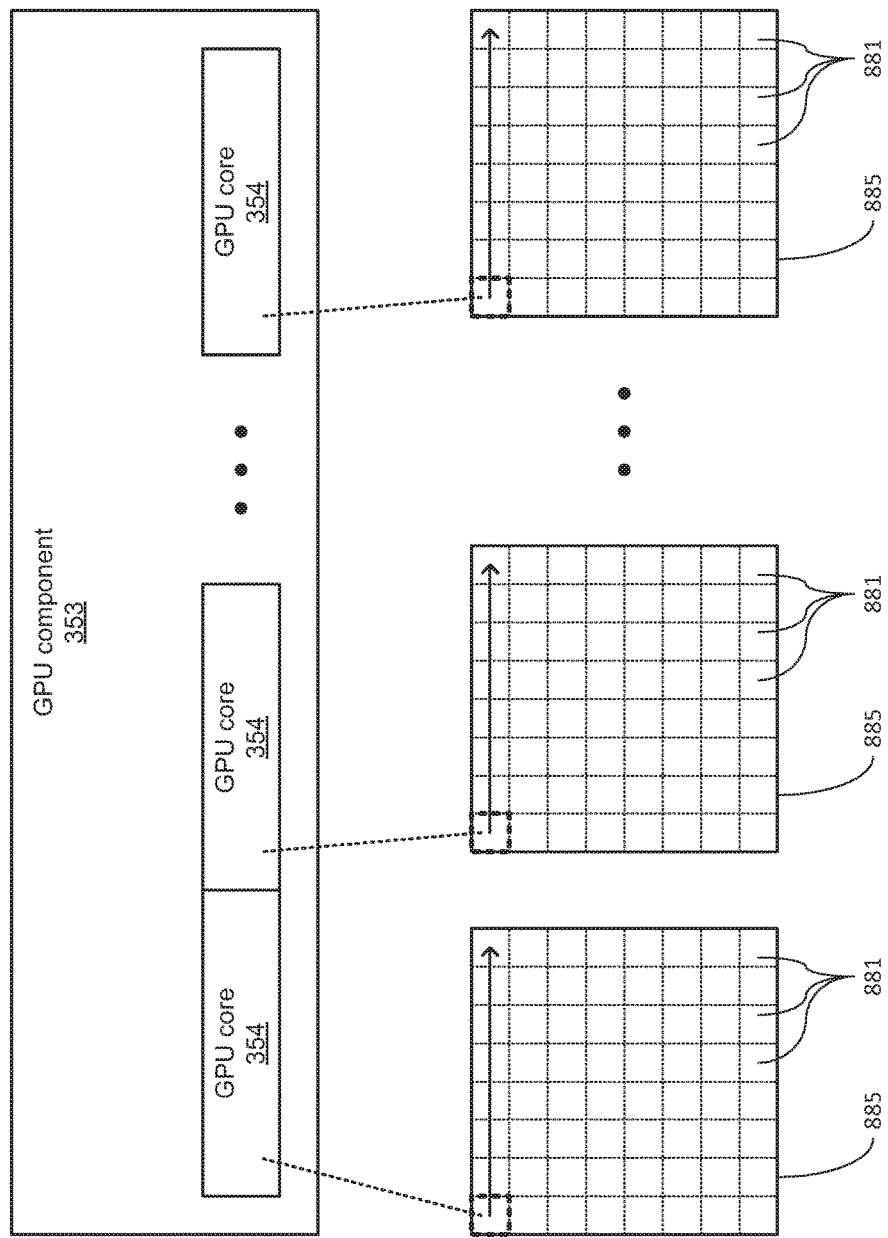

Turning to FIG. 7B, as previously discussed, one or more of the coprocessing components 352 may execute instructions of the transform component 341-*w*, thereby causing the one or more coprocessing components 352 to perform one or more transforms to generate the metadata 131-*w* in preparation for subsequent processing to identify a ROI 889-*w* within the captured image 880 in which an instance of the digital watermark 775-*w* may be present. Again, the one or more coprocessing components 352 may be caused to divide the captured image 880 into multiple tiles 885 (of which only a few are shown for sake of clarity). For each one of the tiles 885, a separate portion of one or more SIMD registers of one or more SIMD components 355, or multiple GPU cores of one or more GPU components 353, may be used to perform a transform with the grayscale values retrieved from the image data 130 for each of the pixels 881 within each tile 885 to derive corresponding metadata data values for each tile 885 that may be stored as the metadata 131-*w*. FIGS. 8A, 8B and 8C, together, depict an example of such use of at least one coprocessing component 352 to simultaneously perform an identical transform with all of the tiles 885 within a full row of tiles 885 extending horizontally across the captured image 880, as shown more specifically in FIG. 8A. More precisely, and turning more specifically to FIG. 8B, the side-by-side lanes 357 within each of one or more SIMD registers 356 of a SIMD component 355 may be employed to simultaneously convolve the performance of the same transform (e.g., using one of the forms of the stencil 886 of either FIG. 5A-C or 6A-C) among the pixels 881 within each tile 885 within such a full row of tiles 885. Alternatively, and turning more specifically to FIG. 8C, multiple GPU cores 354 of a GPU component 352 may be employed to similarly simultaneously convolve the performance of the same transform among the pixels 881 within each tile 885 within such a full row of tiles 885.

Referring to all of FIGS. 8A-C, it should be noted that, in embodiments in which the 1D indicia 775-1 and/or the 2D-indicia 775-2 are also to be decoded in addition to the digital watermark 775-*w*, the at least one coprocessing component 352 used in effecting such a parallel performance (e.g., either the at least one SIMD component 355 of FIG. 8B, or the at least one GPU component 353 of FIG. 8C) the may divide the captured image 880 into the very same set of tiles 885 as part of performing the corresponding transforms for each. This may be done in spite of the particular transforms that are performed in preparation for identifying ROI(s) 889-1, 889-2 and 889-*w* associated with each of the 1D indicia 775-1, the 2D indicia 775-2 and the digital watermark 775-*w*, respectively, being different transforms and/or different sets of transforms.

As previously discussed, the image sensor 110 may output a serial bitstream of grayscale values organized in horizontal raster scan order starting with the topmost horizontal row and proceeding downward to the bottommost horizontal row. In such embodiments, advantage may be taken of this ordering of grayscale values to perform the one or more transforms on whole horizontal rows of the tiles 885 at a time to generate the metadata 131-*w*, as the image sensor 110 provides grayscale values for a sufficient number of horizontal rows of pixels 881 to enable at least the commencement of performance of the one or more transforms with each successive horizontal row of tiles 885. More specifically, advantage may be taken of this ordering to utilize one or more SIMD registers 356 of the at least one SIMD component 335, or multiple GPU cores 354 of the at least one GPU component 353, to perform the one or more transforms simultaneously within all of the tiles 885 within whole horizontal rows of the tiles 885, starting with the topmost row thereof.

Returning to FIG. 7B, as previously discussed, unlike the 1D indicia 775-1 or the 2D indicia 775-2, there may be multiple instances of the digital watermark 775-*w* arranged upon the label or portion 770-*w* of the object 700 in a tiled manner among multiple tiles 771. in some embodiments. In some embodiments, multiple transforms may be performed with the pixels 881 within each of the tiles 885 to generate the metadata 131-*w* as part of identifying an ROI 889-*w* in which at least one complete instance of the digital watermark 775-*w* may be present. In some embodiments, one or more S-transforms may be among the multiple transforms performed. Alternatively or additionally, among the multiple transforms performed may be one or more filters and/or spatial transforms to condition the grayscale values of the pixels 881 prior to the performance of other transform(s). In embodiments in which more than one of the 1D indicia 775-1, the 2D indicia 775-2 and the digital watermark 775-*w* are to be decoded, and in which one or more of the transforms associated with different ones of these are the same, the results of the performance of such one or more transforms may be used in the generation of more than one of the metadata 131-1, 131-2 and 131-*w* to avoid repeating a performance of a transform.

Figure 7C:
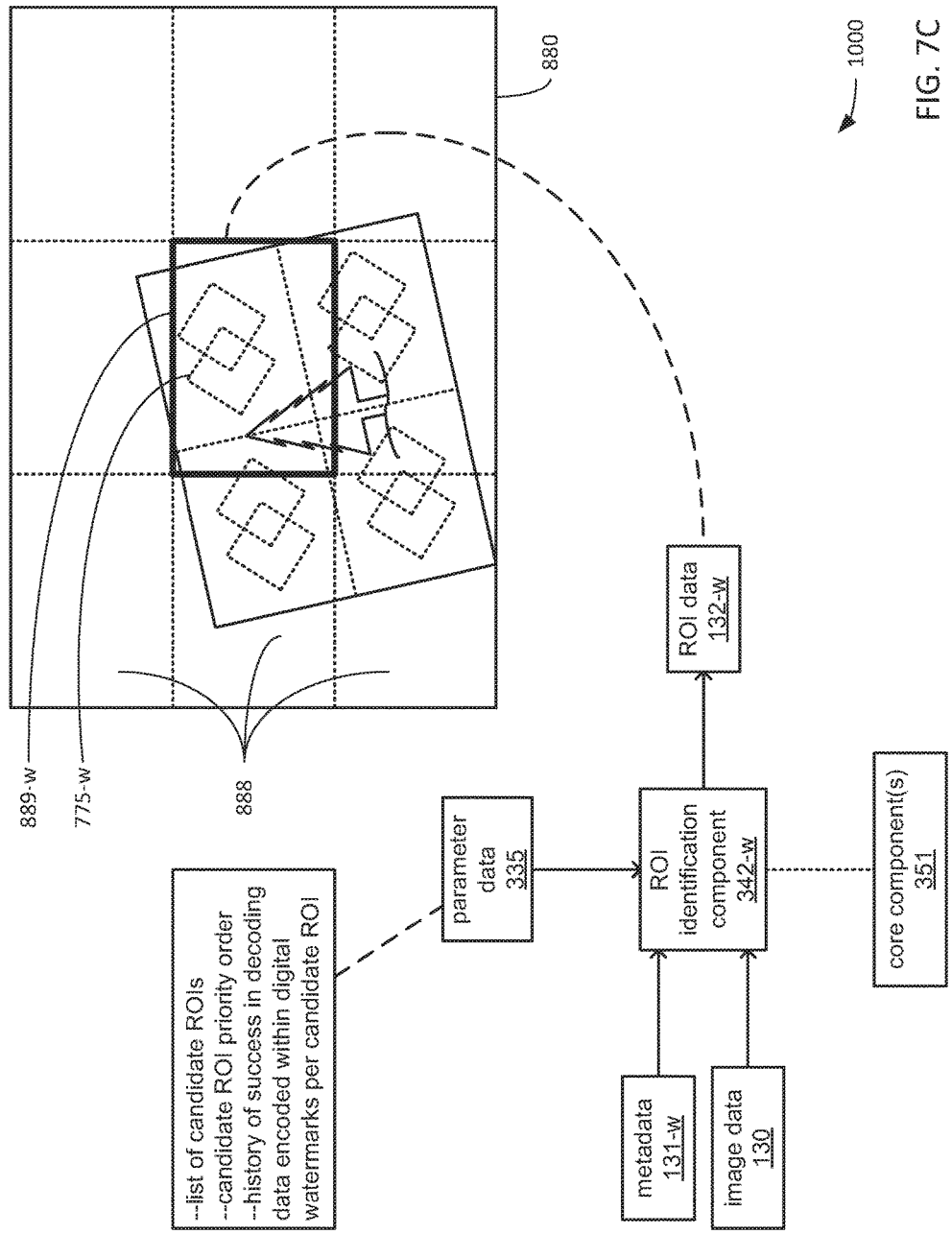

Turning more specifically to FIG. 7C, as previously discussed, one or more core components 351 of the processor 350 may be caused to execute instructions of the ROI identification component 342-*w* to perform an analysis of one or more metadata values within the metadata 131-*w* for each tile 885 as part of identifying one or more candidate ROIs 888 that may include at least one complete instance of the digital watermark 775-*w*. In some embodiments, the manner in which such ones of the candidate ROIs 888 may be identified may differ from the manner in which the earlier discussed ROIs 889-1 for the 1D indicia or the ROI 889-2 for the 2D indicia 775-2 may be identified. In such embodiments, the captured image 880 may be divided into a set of candidate ROIs 888 that may each be analyzed to first identify ones of the candidate ROIs 888 that may include a complete instance of the digital watermark 775-*w* as a result of including pixels 881 and/or tiles 885 that are indicated in the metadata 131-*w* as having characteristic(s) suggestive of there being at least a portion of the digital watermark 775-*w* therein.

Unfortunately, having such suggestive characteristics may only serve as an indication of a likelihood of a candidate ROI 888 including at least part of an instance of the digital watermark 775-*w*, and may be incapable of providing any indication of whether there is a complete instance of the digital watermark 775-*w* therein, or not. As will be familiar to those skilled in the art, successful digital watermark decoding to decode data that is encoded therein may require a complete instance of a digital watermark. Thus, confirmation of whether any of the candidate ROIs 888 actually includes a complete instance of the digital watermark 775-*w* therein may be possible only by subsequently attempting to perform a digital watermark decode therein. However, as will also be familiar to those skilled in the art, each such attempted performance of digital watermark decoding may consume considerable processing resources. Therefore, the performance of the analysis of each candidate ROI 888 to identify ones for such subsequent attempted digital watermark decoding may serve to reduce the quantity of the candidate ROIs 888 within which such subsequent digital watermark decoding is attempted, thereby reducing overall consumption of processing resources. Additionally, in embodiments in which the camera 100 is operated to capture a new image at a recurring interval, there may not be sufficient time available to attempt a digital watermarking decode within every candidate ROI 888, and therefore, such analysis to identify of ones of the candidate ROIs 888 that may include a complete instance of the digital watermark 775-*w* therein may serve to increase the likelihood of success in decoding such a complete instance within a limited amount of time before processing of one captured image 880 must cease to allow processing of the next captured image 880 to begin.

It should be noted that, although the set of candidate ROIs 888 is depicted in FIG. 7C as resembling a tiled grid of identically sized candidate ROIs 888, other embodiments are possible in which the set of candidate ROIs 888 may not be organized across the captured image 880 in such a manner. More specifically, in other embodiments, the candidate ROIs 888 may not be organized into a grid and/or at least some of the candidate ROIs 888 may overlap. Alternatively or additionally, the candidate ROIs 888 may not all be of the same shape and/or size (as measurable in pixels 881). By way of example, a set of candidate ROIs 888 may be defined in which there is a greater density of overlapping candidate ROIs 888 at the center of the captured image 880 than at the edges thereof. The sizing and/or location of each of the candidate ROIs 888 may be based on expectations of where a complete instance of the digital watermark 775-*w* is expected to be within the captured image 880. Alternatively or additionally, such expectations may lead to the assignment of prioritization among the candidate ROIs 888 that may specify an order in which the candidate ROIs 888 may be analyzed to identify ROI(s) 889-*w* in which a complete instance of the digital watermark 775-*w* may be present. FIG. 7D depicts multiple examples of different ways in which a captured image 880 may be divided into multiple candidate ROIs 888.

The parameter data 335 may include a list of the candidate ROIs 888, including definitions of the locations, shapes and/or sizes of each within the captured image 880. Again, in some embodiments, an ordering of the candidate ROIs 888 within the list may be defined within the parameter data 335, and the one or more core components 351 may be caused to perform the analysis of the candidate ROIs 888 in the list in that order to identify one or more of the candidate ROIs 888 as being ROI(s) 889-*w* that may include a complete instance of the digital watermark 775-*w*. And again, such an ordering may reflect a prioritization of the order in which candidate ROIs 888 are analyzed to identify ROI(s) 889-*w* in which a complete instance of the digital watermark 775-*w* may be present. Alternatively, instead of following such a pre-defined ordering of the candidate ROIs 888, the one or more core components 351 may be caused to refer to a history stored in the parameter data 335 of which one or more of the candidate ROIs 888 have more frequently been confirmed to have a complete instance of digital watermark therein as a result of past successful digital watermark decodes therein for previously captured images. Thus, with each new captured image received from the camera 100, the one or more core components 351 may be caused to, at least initially, select the one of the candidate ROIs 888 that has a history of being the one of the candidate ROIs 888 within which a complete instance of a digital watermark has been successfully decoded most frequently. Stated differently, the one or more core components 351 may derive an order of prioritization in which to analyze the candidate ROIs 888 based on such a history of relative rates of successful decoding.

Upon identifying one(s) of the candidate ROIs 888 that may include a complete instance of the digital watermark 775-*w* therein, the one or more core components 351 may be caused by execution of the ROI identification component 342-*w* to retrieve the grayscale values within the image data 130 for the pixels 881 of the portion(s) of the captured image 880 that correspond to each such identified ROI 889-*w*. The one or more core components 351 may then be caused to store those grayscale values of the pixels 881 of the one or more identified ROIs 889-*w* within the ROI data 132-*w*.

Figure 7E:
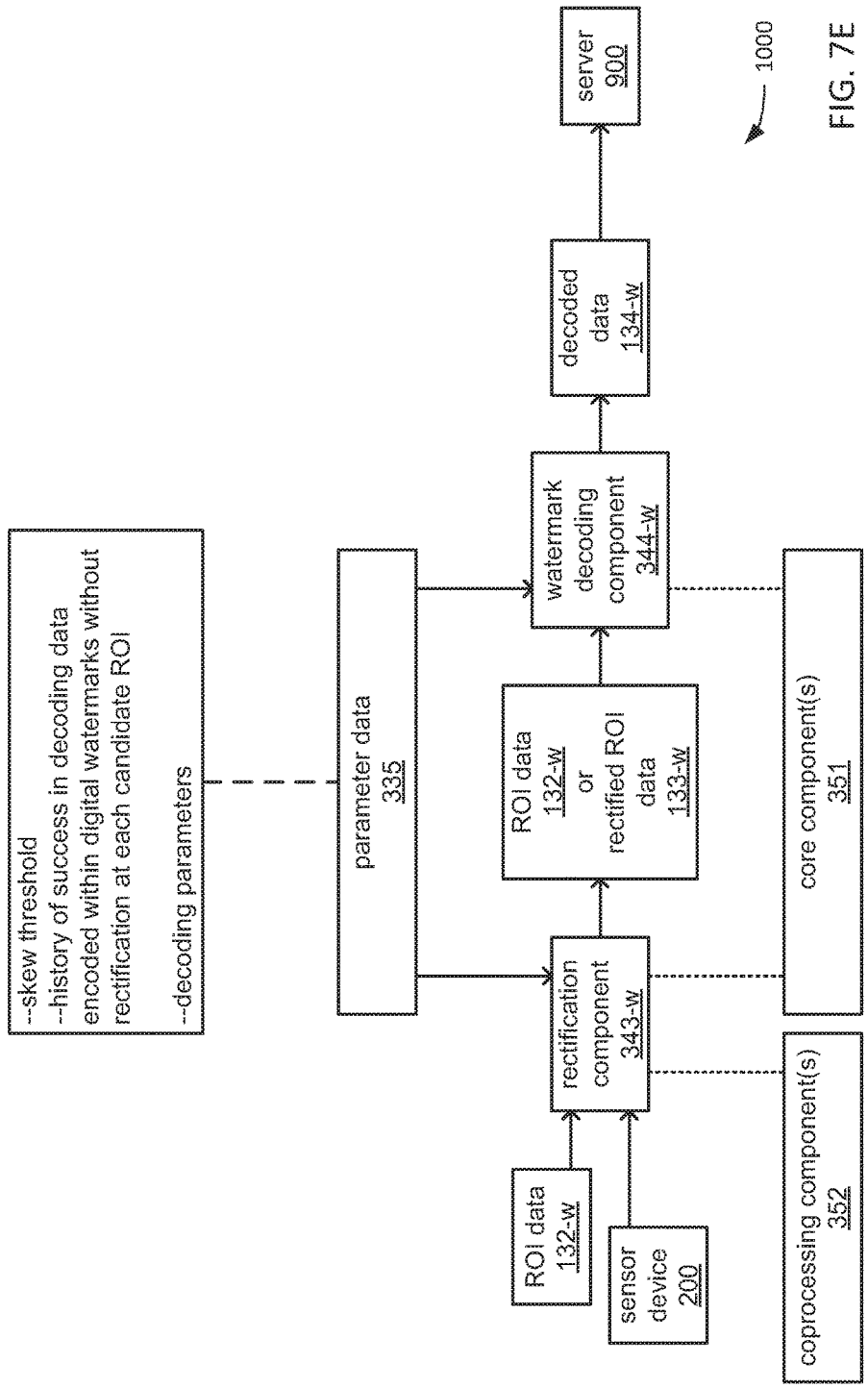

Turning to FIG. 7E, as previously discussed, one or more coprocessing components 352 of one or more processors 350 may execute instructions of the rectification component 343-*w*, thereby causing the one or more coprocessing components 352 to perform rectification using homography with the portion of the captured image 880 that is within each of the identified ROIs 889-*w* (as stored as the ROI data 132-*w*) to generate corresponding rectified images thereof. Such rectified ROIs may then be stored as the rectified data 133-*w*.

In some embodiments, one or more core components 351 of one or more processors 350 may be caused to make a determination of whether such rectification is to be performed. In some of such embodiments that include at least one sensor device 200, the one or more core components 351 may be caused to operate the network interface 390 to receive an indication provided by the at least one sensor device 200 of the degree of skew detected by the skew sensor 210 thereof. The one or more core components 351 may compare the detected degree of skew to a skew threshold specified in the parameter data 335, and may determine whether rectification should be performed based on that comparison. Alternatively or additionally, and as previously discussed, the image sensor 110 and/or another component of at least one camera 100 may be capable of detecting the degree of skew in lieu of or in addition to the skew sensor 210 of the at least one sensor device 200. In still others of such embodiments, the one or more core components 351 may, over time, generate and maintain a history of the frequency with which digital watermarks have been successfully decoded at the location of each candidate ROI 888 without rectification having been performed in preparation for such decoding. It may be that such a history may be separately generated and maintained for each such location, and may include histories of rates of success and/or failure of decoding for each such location for both instances in which rectification was performed and in which rectification was not performed. The one or more core components 351 may then determine whether rectification should be performed based on such history. In some embodiments, the determination of whether to perform such rectification may be made once for all identified ROIs 889-*w* associated with the captured image 880. In other embodiments, the determination of whether to perform such rectification may be made individually for each identified ROI 889-*w*.

As will be familiar to those skilled in the art, the performance of rectification based on any of a wide variety of homography techniques (e.g., any of a variety of mathematical homography transforms) may consume considerable processing resources. Thus, it may be deemed desirable to avoid and/or limit the performances of rectification, where possible. Again, there may also be a time constraint in which there may be a limited period of time in which processing of one captured image 880 may need to be completed before processing of a next captured image must begin. Thus, each performance of rectification may consume processing resources that could have been used in the performance of other tasks associated with the captured image 880.

Continuing with FIG. 7E, as previously discussed, one or more core components 351 of one or more processors 350 may be caused to execute instructions of the watermark indicia decoding component 344-*w* to perform digital watermark decoding in which an attempt is made to interpret a complete instance of the digital watermark 775-*w* within each identified ROI 889-*w* to decode the data that is encoded within the digital watermark 775-*w*. In interpreting the digital watermark 775-*w* within an ROI 889-*w* to decode the encoded data therein, the one or more core components 351 may employ various decoding parameters that may also be stored as part of the parameter data 335. Such decoding parameters may include one or more sets of rules by which a digital watermark that adheres to one or more standards for digital watermarks may be interpreted. If such decoding is successful, the resulting decoded data 134-*w* may be stored in preparation for subsequent transmission. The one or more core components 351 may be caused to operate the network interface 390 to transmit the decoded data 134-*w* to another device via the network 999, such as the depicted server 900.

However, if such interpretation of the digital watermark 775-*w* to decode the data encoded therein is not successful, then the assumption may be made that the identified ROI 889-*w* within which the decode was attempted either does not include a complete instance of the digital watermark 775-*w*, or does not include any digital watermark despite the analysis of the metadata 131-*w* being suggestive of there being a digital watermark therein. In response to such lack of success, one or more core components 351 may again execute the ROI identification component 342-*w* to attempt digital watermark decoding within another identified ROI 889-*w*, if there is another identified ROI 889-*w* within which digital watermark decoding can be attempted.

In some embodiments, attempts to perform digital watermark decoding may be made within each identified ROI 889-*w* until there is a successful decoding of the digital watermark 775-*w* within one of the identified ROIs 889-*w*, or until there are no more identified ROIs 889-*w* within which to attempt decoding, or until there remains insufficient time to perform another attempt at digital watermark decoding before processing of the captured image 880 must cease. As a result, there may be no successful decoding of the digital watermark 775-*w* from within the captured image 880, and this may occur despite multiple complete instances of the digital watermark 775-*w* being present within the captured image 880.

It should be noted that the analysis of each candidate ROI 888 to identify the one(s) that become the identified ROI(s) 889-*w* in which there may be a complete instance of the digital watermark 775-*w* (if any analysis is performed), the rectification of each identified ROI 889-*w* (if any rectification is performed), and the performance of digital watermark decoding with each identified ROI 889-*w* (whether rectified, or not) may be performed with varying degrees of parallelism in different embodiments. Such parallelism may be enabled by the availability of more than one of the core components 351 and/or more than one of the coprocessing components 352. By way of example, the performance of rectification (if any) and of digital watermark decoding may occur immediately following the identification of a candidate ROI 888 as an identified ROI 889-*w*, even as analysis of the metadata 131-*w* continues to attempt to so identify more ROIs 889-*w*. Alternatively or additionally, by way of another example, the performance of digital watermark decoding within one identified ROI 889-*w* may occur immediately following the performance of rectification thereon, even as rectification of another identified ROI 889-*w* is performed. As a result, in some embodiments, depending on available processing and/or resources, depending on whether one or more indicia are also to be decoded along with the digital watermark 775-*w*, depending on the quantity of candidate ROIs 888 and/or identified ROIs 889-*w*, and/or depending on the amount of time available, analysis of the metadata 131-*w* and/or performance(s) of rectification may be ongoing when either a complete instance of the digital watermark 775-*w* is decoded or when there ceases to be sufficient time available to perform another digital watermark decode within another identified ROI 889-*w*.

Figure 9A:
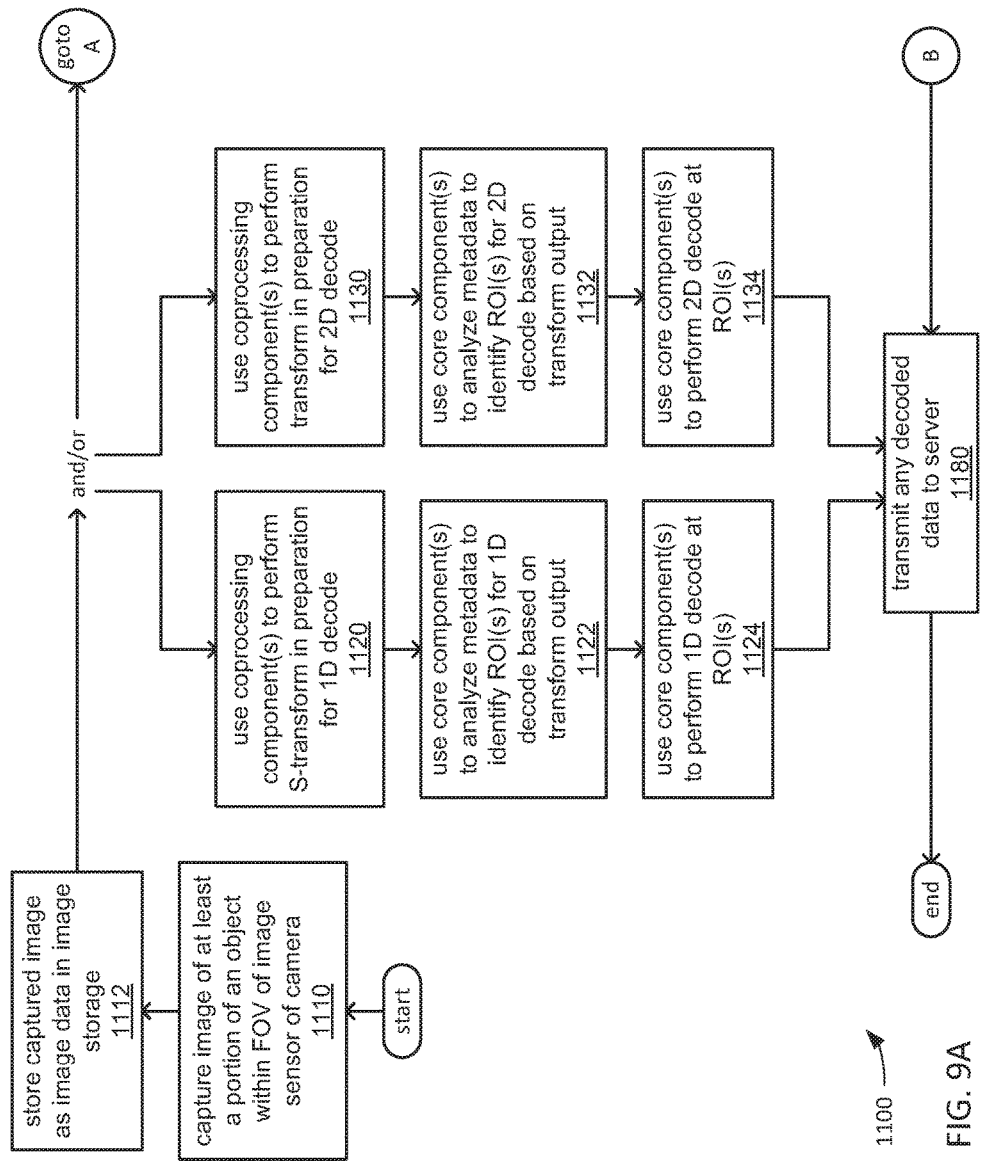
FIGS. 9A and 9B, together, show aspects of the operation of an implementation of the system of FIG. 1.
Figure 9B:
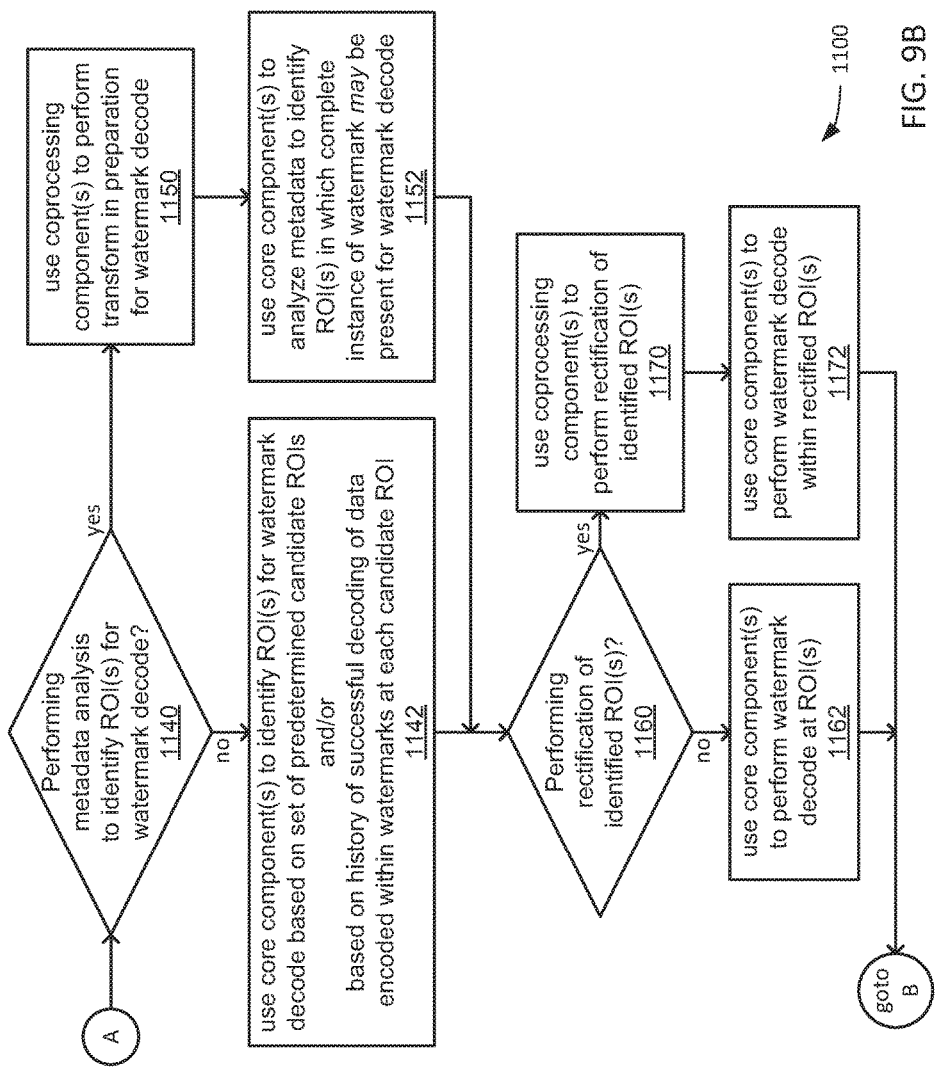

FIGS. 9A and 9B, together, provide a flowchart 1100 depicting aspects of operation of the decoding system 1000. More specifically, FIGS. 9A-B depict aspects of operations performed by at least one processor 350 of the decoding device 300 under the control of instructions of the control routine 340.

At 1110, an image sensor of a camera of a decoding system (e.g., the image sensor 110 of the camera 100 of the decoding system 1000) captures an image of at least a portion of an object within its FOV (e.g., the captured image 880 of at least a portion of the object 700 within the FOV 117). At 1112, at least one core component of at least one processor of a decoding device of the decoding system (e.g., at least one core component 351 of at least one processor 350 of the decoding device 300) may store the captured image within a storage of the decoding device as image data (e.g., the image data 130 within the storage 360).

As has been discussed, in various embodiments, identification and decoding of differing ones of, or differing combinations of encoded data markings, such as differing ones of, or differing combinations of, a 1D indicia, a 2D indicia and a digital watermark, may be performed. Thus, following the storage of the captured image at 1112, in differing embodiments, at least one coprocessing component of the at least one processor (e.g., at least one coprocessing component 352, such as at least one GPU component 353 or at least one SIMD component 355) may perform one or more differing transforms associated with one or more of a 1D indicia, a 2D indicia and a digital watermark at one or more of 1120, 1130 and 1140, respectively. It should be noted that, in embodiments in which transforms of more than one of a 1D indicia, a 2D indicia and a digital watermark are performed at least partially in parallel, the performances of transforms at two or more of 1120, 1130 and/or 1140 may occur at least partially in parallel.

Turning to 1120, at least one coprocessing component may be used to perform a Saporetti transform (S-transform) with grayscale values of pixels within each of multiple tiles into which the captured image may be divided (e.g., grayscale values of pixels 881 of the multiple tiles 885) to generate metadata in preparation for analysis to identify one or more ROIs in which a 1D indicia may be present (e.g., the metadata 131-1 associated with the 1D indicia 775-1). At 1122, at least one core component of the processor may be used to analyze the metadata associated with 1D indicia to identify one or more ROIs within which a 1D indicia may be present (e.g., one or more ROIs 889-1). At 1124, at least one core component of the processor may be used to perform a 1D decode of the 1D indicia within such an ROI to decode data encoded therein.

Turning to 1130, at least one coprocessing component may be used to perform one or more transforms with grayscale values of pixels within each of the multiple tiles to generate metadata in preparation for analysis to identify one or more ROIs in which a 2D indicia may be present (e.g., the metadata 131-2 associated with the 2D indicia 775-2). At 1132, at least one core component of the processor may be used to analyze the metadata associated with 2D indicia to identify one or more ROIs within which a 2D indicia may be present (e.g., one or more ROIs 889-2). At 1324, at least one core component of the processor may be used to perform a 2D decode of the 2D indicia within such an ROI to decode data encoded therein.

Turning to 1140, at least one core component of the processor may make a determination of whether or not to perform an analysis of metadata (e.g., the metadata 131-*w*) to identify one or more ROIs of a set of candidate ROIs that may include a complete instance of a digital watermark for decoding (e.g., the one or more identified ROIs 889-*w* from among the candidate ROIs 888 as being ROIs that may include a complete instance of the digital watermark 775-*w*). As has been discussed, such other factors may include a predetermined selection of one or more candidate ROIs that are to be the identified ROIs within which the digital watermark decoding is to be attempted. Again, by way of example, it may be expected that a complete instance of the digital watermark will be present at one or more specific locations within the captured image such that the performance of such an analysis is deemed superfluous, and an indication of one or more ROIs that are to serve as the identified ROI(s) without the performance of an analysis to identify them may be stored as parameters for the at least one core component to retrieve. Alternatively or additionally, such other factors for identifying one or more of the candidate ROIs as identified ROIs that may each include a complete instance of the digital watermark may be a recorded history of rates of successful digital watermark decoding within the location of each of the candidate ROIs.

If, at 1140, the determination is made that such an analysis is not to be performed, then at 1142, the at least one core component may employ such other factors to identify one or more ROIs of the set of candidate ROIs as identified ROIs that may each include a complete instance of the digital watermark.

However, if at 1140, a determination is made that such an analysis is to be performed, then at 1150, at least one coprocessing component of the at least one processor may be used to perform one or more transforms with grayscale values of pixels within each of the multiple tiles into which the captured image may be divided to generate metadata in preparation for such an analysis. At 1152, at least one core component may be used to analyze the metadata to identify one or more of the candidate ROIs of the set of candidate ROIs as being identified ROI(s) that may each include a complete instance of the digital watermark. As has been discussed, such an analysis may be performed in a manner that follows a specific order of the candidate ROIs. Again, such an order may be specified as a stored parameter to be retrieved by the one or more core components, or may be derived by the one or more core components based on an evaluation of a recorded history of rates of successful digital watermark decoding within the location of each of the candidate ROIs.

At 1160, following the identification of one or more ROIs at either 1142 or 1152, at least one core component of the at least one processor may make a determination of whether or not to perform rectification of the portion of the captured image within each of one or more of the identified ROIs to reduce or eliminate the skew between the plane of the captured image and the plane of a surface of the object that carries the digital watermark (e.g., the label of portion 770-*w* of the object 700). As has been discussed, this determination may be based on an indication received from a skew sensor or other device or component (e.g., the skew sensor 210 of the sensor device 200) of the degree of skew between the plane of the captured image (which may be determined by the plane of the image sensor 110 of the camera 100 that captured the image) and the plane of that surface of the object. Alternatively, this determination may be based on a recorded history of rates of successful digital watermark decoding within the location of each of the candidate ROIs that are among the one or more identified ROIs.

If, at 1160, the determination is made that such rectification is not to be performed, then at 1162, at least one core component of the at least one processor may be used to perform a digital watermark decode at the one or more identified ROIs to attempt to decode data encoded within the digital watermark. As has been discussed, it may be that confirmation of whether there is a complete instance of the digital watermark within any of the identified ROIs is possible only by attempting a performance of digital watermark decoding thereat. Again, a performance of analysis of the metadata (if such an analysis is performed at 1152) may only be capable of determining that the grayscale values of a candidate ROI have characteristics consistent with at least a portion of the digital watermark being present therein, and may not be capable of providing an indication of whether the instance of the digital watermark that may be present therein is a complete instance. Therefore, the at least one core component may perform digital watermark decoding at each identified ROI until a successful decoding of a complete instance of the digital watermark occurs, or until there are no more identified ROIs at which to perform digital watermark decoding, or until insufficient time remains to perform another digital watermark decoding.

However, if at 1160, the determination is made that such rectification is to be performed, then at 1170, at least one coprocessing component may be used to perform such rectification with at least a subset of one or more identified ROIs. At 1172, either following the performance(s) of rectification at 1170, or at least partially in parallel with the performance(s) of rectification at 1170, at least one core component of the at least one processor may be used to perform digital watermark decoding at each of the rectified ones of the identified ROI(s) to attempt to decode data encoded within the digital watermark. Again, the at least one core component may perform digital watermark decoding at each identified ROI until a successful decoding of a complete instance of the digital watermark occurs, or until there are no more identified ROIs at which to perform digital watermark decoding, or until insufficient time remains to perform rectification and/or digital watermark decoding with another identified ROI.

At 1180, at least one core component of the at least one processor may operate a network interface of the decoding device (e.g., the network interface 390) to transmit any data that may be been successfully decoded at 1124, 1134, 1162 and/or 1172 to another device via a network (e.g., to the server 900 via the network 999).

There is thus disclosed a system to capture and decode encoded data. A decoding device includes: storage configured to store image data received from at least one camera, wherein the image data comprises grayscale values of pixels in a two-dimensional (2D) array of pixels in each captured image of multiple captured images that are captured by the at least one camera; and a processor coupled to the storage. The processor includes multiple single-instruction multiple data (SIMD) components, wherein, for each captured image: at least one available SIMD component of the multiple SIMD components is selected to perform at least one transform with the grayscale values of the pixels of at least one portion of the captured image to generate at least one metadata that corresponds to the captured image; and the at least one available SIMD component is configured to perform the at least one transform in preparation for an analysis of the at least one metadata by at least one core component. The processor also includes the at least one core component configured to: perform the analysis of the at least one metadata to identify at least one region of interest (ROI) within the captured image that is indicated by the at least one metadata to include at least one encoded data marking; and perform a decoding of the at least one ROI identified within the captured image to attempt a decode of the at least one encoded data marking within the at least one ROI.

The at least one camera may include multiple cameras; the at least one core component may be configured to receive at least one captured image of the multiple captured images from each camera of the multiple cameras, and store each received image in the storage as part of the image data; and the selection of the at least one available SIMD component to perform the at least one transform with the grayscale values of the pixels of the at least one portion of each captured image may include a selection of a separate available SIMD component to perform the transform with the at least one captured image captured by each camera.

Each captured image may be divided into multiple predetermined portions; and the selection of the at least one available SIMD component to perform the at least one transform with the grayscale values of the pixels of the at least one portion of a captured image may include a selection of a separate available SIMD component to perform the transform with each predetermined portion of the multiple predetermined portions of the captured image. The multiple predetermined portions may cover all of the captured image; and it may be that no predetermined portion of the multiple predetermined portions overlaps another predetermined portion of the multiple predetermined portions. A first predetermined portion of the multiple predetermined portions may overlap a second predetermined portion of the multiple predetermined portions to enable at least a portion of an encoded data marking to be present within both the first and second predetermined portions.

The at least one encoded data marking may include multiple encoded data markings of different types; each type of the different types may be selected from a group consisting of a one-dimensional (1D) indicia, a two-dimensional (2D) indicia, and a digital watermark; and the selection of the at least one available SIMD component to perform the at least one transform with the grayscale values of the pixels of the at least one portion of each captured image may include a selection of a separate available SIMD component to perform a different transform for each type of the different types.

For each captured image: the at least one encoded data marking may include at least one digital watermark; the performance of the decoding of the at least one ROI may include a performance of watermark decoding of either the grayscale values of the pixels within the at least one ROI, or grayscale values of pixels of rectified ROI data generated for the at least one ROI, to decode the at least one digital watermark within the at least one ROI; the at least one core component may be further configured to determine whether rectification is to be performed with the grayscale values of the pixels within the at least one ROI identified during the analysis to generate the rectified ROI data; and at least one other available SIMD component of the multiple SIMD components may be configured to, in response to a determination that rectification is to be performed with the grayscale values of the pixels within the at least one ROI identified within the captured image, perform the rectification in preparation for the performance of the watermark decoding. For each captured image, the at least one core component may be configured to: receive, from at least one sensor coupled to the processor, input indicative of a degree of skew of a surface of an object that is within a field of view (FOV) of the at least one camera from a plane of the pixels of the captured image; and determine whether to perform the rectification based on the degree of skew. For each captured image, the at least one core component may be configured to determine whether to perform rectification based on a degree of success in past interpretations of digital watermarks where rectification was not performed.

For each captured image: the at least one encoded data marking may include at least one digital watermark; the metadata may include a map of metadata values indicative of at least a watermark characteristic of the grayscale values of tiles of the pixels within the at least one portion of the captured image that indicate a set of candidate ROIs; and the at least one core component may be configured to identify the at least one ROI from among the set of candidate ROIs based on at least the watermark characteristic.

For each captured image: the at least one encoded data marking may include an indicia; the metadata may include a map of metadata values indicative of at least an indicia characteristic of the grayscale values of tiles of the pixels within the at least one portion of the captured image; and the at least one core component may be configured to identify the at least one ROI among the tiles based on at least the indicia characteristic. The indicia may include a two-dimensional (2D) indicia. The indicia may include a one-dimensional (1D) bar code, and the at least one transform may include a Saporetti transform.

Each grayscale value may include of a value selected from a group consisting of: a level of intensity of a monochromatic pixel, wherein the captured image is a monochromatic image; a level of intensity of a color pixel, wherein the captured image is a color image and the grayscale value is accompanied by at least one chrominance value that specifies a color of the color pixel; and a level of intensity of a color component of a plurality of color components that cooperate to specify a color of a color pixel, wherein the captured image is a color image.

A decoding system includes: multiple cameras, wherein each camera comprises an image sensor configured to capture an image of multiple captured images, and each camera output a captured image of the multiple captured images as a bitstream of image data comprising grayscale values of pixels in a two-dimensional (2D) array of pixels of the captured image; and a processor coupled to the multiple cameras. The processor includes multiple single-instruction multiple data (SIMD) components, wherein, for each captured image: at least one available SIMD component of the multiple SIMD components is selected to perform at least one transform with the grayscale values of the pixels of at least one portion of the captured image to generate at least one metadata that corresponds to the captured image; and the at least one available SIMD component is configured to perform the at least one transform in preparation for an analysis of the at least one metadata by at least one core component. The processor also includes the at least one core component configured to: perform the analysis of the at least one metadata to identify at least one region of interest (ROI) within the captured image that is indicated by the at least one metadata to include at least one encoded data marking; and perform a decoding of the at least one ROI identified within the captured image to attempt a decode of the at least one encoded data marking within the at least one ROI.

The at least one encoded data marking may include multiple encoded data markings of different types; each type of the different types may be selected from a group consisting of a one-dimensional (1D) indicia, a two-dimensional (2D) indicia, and a digital watermark; and the selection of the at least one available SIMD component to perform the at least one transform with the grayscale values of the pixels of the at least one portion of each captured image may include a selection of a separate available SIMD component to perform a different transform for each type of the different types.

For each captured image: the at least one encoded data marking may include at least one digital watermark; the performance of the decoding of the at least one ROI may include a performance of watermark decoding of either the grayscale values of the pixels within the at least one ROI, or grayscale values of pixels of rectified ROI data generated for the at least one ROI, to decode the at least one digital watermark within the at least one ROI; the at least one core component may be further configured to determine whether rectification is to be performed with the grayscale values of the pixels within the at least one ROI identified during the analysis to generate the rectified ROI data; and at least one other available SIMD component of the multiple SIMD components may be configured to, in response to a determination that rectification is to be performed with the grayscale values of the pixels within the at least one ROI identified within the captured image, perform the rectification in preparation for the performance of the watermark decoding. For each captured image, the core component may be configured to: receive, from at least one sensor coupled to the processor, input indicative of a degree of skew of a surface of an object that is within a field of view (FOV) of a camera of the multiple cameras from a plane of the pixels of the captured image; and determine whether to perform the rectification based on the degree of skew.

The at least one core component may include multiple core components; a first core component of the multiple core components may be configured to monitor the availability of each SIMD component, for each captured image, perform the selection of the at least one available SIMD component to perform the at least one transform, and for each captured image, select a core component of the multiple core components to perform the analysis of the at least one metadata and the decoding of the at least one ROI; and at least a second core component of the multiple core components may be configured to, for each captured image, perform the analysis of the at least one metadata and the decoding of the at least one ROI.

For each captured image: the at least one encoded data marking may include an indicia; the metadata may include a map of metadata values indicative of at least an indicia characteristic of the grayscale values of tiles of the pixels within the at least one portion of the captured image; and the at least one core component may be configured to identify the at least one ROI among the tiles based on at least the indicia characteristic. The indicia may include a two-dimensional (2D) indicia.

The indicia may include a one-dimensional (1D) bar code, and the at least one transform may include a Saporetti transform convolved among pixels of each tile of a plurality of tiles into which the at least one ROI is divided. The at least one metadata may include at least one metadata value selected from a set consisting of: a lowest grayscale value among a 2D array of pixels of a tile; a highest grayscale value among the 2D array of pixels of a tile; a value indicative of a contrast between grayscale values of adjacent pixels within the 2D array of pixels of a tile; and a quantity of parallel lines within the 2D array of pixels of a tile. The analysis of the at least one metadata may include a comparison of the at least one metadata value to a threshold selected from a set consisting of: a minimum difference between the highest grayscale value and the lowest grayscale value; a minimum value for the contrast; and a minimum quantity of parallel lines within a tile of the plurality of tiles.

A decoding device includes: storage configured to store image data received from at least one camera, wherein the image data comprises grayscale values of pixels in a two-dimensional (2D) array of pixels in each captured image of multiple captured images that are captured by the at least one camera; and a processor coupled to the storage. The processor includes multiple graphics processing unit (GPU) components, wherein, for each captured image: at least one available GPU component of the multiple GPU components is selected to perform at least one transform with the grayscale values of the pixels of at least one portion of the captured image to generate at least one metadata that corresponds to the captured image; and the at least one available GPU component is configured to perform the at least one transform in preparation for an analysis of the at least one metadata by at least one core component. The processor also includes the at least one core component configured to: perform the analysis of the at least one metadata to identify at least one region of interest (ROI) within the captured image that is indicated by the at least one metadata to include at least one encoded data marking; and perform a decoding of the at least one ROI identified within the captured image to attempt a decode of the at least one encoded data marking within the at least one ROI.

The at least one camera may include multiple cameras; the at least one core component may be configured to receive at least one captured image of the multiple captured images from each camera of the multiple cameras, and store each received image in the storage as part of the image data; and the selection of the at least one available GPU component to perform the at least one transform with the grayscale values of the pixels of the at least one portion of each captured image may include a selection of a separate available GPU component to perform the transform with the at least one captured image captured by each camera.

Each captured image may be divided into multiple predetermined portions; and the selection of the at least one available GPU component to perform the at least one transform with the grayscale values of the pixels of the at least one portion of a captured image may include a selection of a separate available GPU component to perform the transform with each predetermined portion of the multiple predetermined portions of the captured image.

The at least one encoded data marking may include multiple encoded data markings of different types; each type of the different types may be selected from a group consisting of a one-dimensional (1D) indicia, a two-dimensional (2D) indicia, and a digital watermark; and the selection of the at least one available GPU component to perform the at least one transform with the grayscale values of the pixels of the at least one portion of each captured image may include a selection of a separate available GPU component to perform a different transform for each type of the different types.

For each captured image: the at least one encoded data marking may include at least one digital watermark; the performance of the decoding of the at least one ROI may include a performance of watermark decoding of either the grayscale values of the pixels within the at least one ROI, or grayscale values of pixels of rectified ROI data generated for the at least one ROI, to decode the at least one digital watermark within the at least one ROI; the at least one core component may be further configured to determine whether rectification is to be performed with the grayscale values of the pixels within the at least one ROI identified during the analysis to generate the rectified ROI data; and at least one other available GPU component of the multiple GPU components may be configured to, in response to a determination that rectification is to be performed with the grayscale values of the pixels within the at least one ROI identified within the captured image, perform the rectification in preparation for the performance of the watermark decoding. For each captured image, the at least one core component may be configured to determine whether to perform rectification based on a degree of success in past interpretations of digital watermarks where rectification was not performed.

For each captured image: the at least one encoded data marking may include at least one digital watermark; the metadata may include a map of metadata values indicative of at least a watermark characteristic of the grayscale values of tiles of the pixels within the at least one portion of the captured image that indicate a set of candidate ROIs; and the at least one core component may be configured to identify the at least one ROI from among the set of candidate ROIs based on at least the watermark characteristic.

For each captured image: the at least one encoded data marking may include an indicia; the metadata may include a map of metadata values indicative of at least an indicia characteristic of the grayscale values of tiles of the pixels within the at least one portion of the captured image; and the at least one core component may be configured to identify the at least one ROI among the tiles based on at least the indicia characteristic. The indicia may include a two-dimensional (2D) indicia. The indicia comprises a one-dimensional (1D) bar code, and the at least one transform may include a Saporetti transform.

The invention claimed is:

1. A decoding device comprising:
storage configured to store image data received from at least one camera, wherein the image data comprises grayscale values of pixels in a two-dimensional (2D) array of pixels in each captured image of multiple captured images that are captured by the at least one camera; and
a processor coupled to the storage, the processor comprising:
multiple single-instruction multiple data (SIMD) components, wherein, for each captured image:
at least one available SIMD component of the multiple SIMD components is selected to perform at least one transform with the grayscale values of the pixels of at least one portion of the captured image to generate at least one metadata that corresponds to the captured image; and
the at least one available SIMD component is configured to perform the at least one transform in preparation for an analysis of the at least one metadata by at least one core component; and
the at least one core component configured to:
perform the analysis of the at least one metadata to identify at least one region of interest (ROI) within the captured image that is indicated by the at least one metadata to include at least one encoded data marking; and
perform a decoding of the at least one ROI identified within the captured image to attempt a decode of the at least one encoded data marking within the at least one ROI.

2. The decoding device of claim 1, wherein:
the at least one camera comprises multiple cameras;
the at least one core component is configured to receive at least one captured image of the multiple captured images from each camera of the multiple cameras, and store each received image in the storage as part of the image data; and
the selection of the at least one available SIMD component to perform the at least one transform with the grayscale values of the pixels of the at least one portion of each captured image comprises a selection of a separate available SIMD component to perform the transform with the at least one captured image captured by each camera.

3. The decoding device of claim 1, wherein:
each captured image is divided into multiple predetermined portions; and
the selection of the at least one available SIMD component to perform the at least one transform with the grayscale values of the pixels of the at least one portion of a captured image comprises a selection of a separate available SIMD component to perform the transform with each predetermined portion of the multiple predetermined portions of the captured image.

4. The decoding device of claim 3, wherein:
the multiple predetermined portions cover all of the captured image; and
no predetermined portion of the multiple predetermined portions overlaps another predetermined portion of the multiple predetermined portions.

5. The decoding device of claim 3, wherein a first predetermined portion of the multiple predetermined portions overlaps a second predetermined portion of the multiple predetermined portions to enable at least a portion of an encoded data marking to be present within both the first and second predetermined portions.

6. The decoding device of claim 1, wherein:
the at least one encoded data marking comprises multiple encoded data markings of different types;
each type of the different types is selected from a group consisting of a one-dimensional (1D) indicia, a two-dimensional (2D) indicia, and a digital watermark; and
the selection of the at least one available SIMD component to perform the at least one transform with the grayscale values of the pixels of the at least one portion of each captured image comprises a selection of a separate available SIMD component to perform a different transform for each type of the different types.

7. The decoding device of claim 1, wherein, for each captured image:
the at least one encoded data marking comprises at least one digital watermark;
the performance of the decoding of the at least one ROI comprises a performance of watermark decoding of either the grayscale values of the pixels within the at least one ROI, or grayscale values of pixels of rectified ROI data generated for the at least one ROI, to decode the at least one digital watermark within the at least one ROI;
the at least one core component is further configured to determine whether rectification is to be performed with the grayscale values of the pixels within the at least one ROI identified during the analysis to generate the rectified ROI data; and
at least one other available SIMD component of the multiple SIMD components is configured to, in response to a determination that rectification is to be performed with the grayscale values of the pixels within the at least one ROI identified within the captured image, perform the rectification in preparation for the performance of the watermark decoding.

8. The decoding device of claim 7, wherein, for each captured image, the at least one core component is configured to:
receive, from at least one sensor coupled to the processor, input indicative of a degree of skew of a surface of an object that is within a field of view (FOV) of the at least one camera from a plane of the pixels of the captured image; and
determine whether to perform the rectification based on the degree of skew.

9. The decoding device of claim 7, wherein, for each captured image, the at least one core component is configured to determine whether to perform rectification based on a degree of success in past interpretations of digital watermarks where rectification was not performed.

10. The decoding device of claim 1, wherein, for each captured image:
the at least one encoded data marking comprises at least one digital watermark;
the metadata comprises a map of metadata values indicative of at least a watermark characteristic of grayscale values of tiles of the pixels within the at least one portion of the captured image that indicate a set of candidate ROIs; and
the at least one core component is configured to identify the at least one ROI from among the set of candidate ROIs based on at least the watermark characteristic.

11. The decoding device of claim 1, wherein, for each captured image:
the at least one encoded data marking comprises an indicia;
the metadata comprises a map of metadata values indicative of at least an indicia characteristic of grayscale values of tiles of the pixels within the at least one portion of the captured image; and
the at least one core component is configured to identify the at least one ROI among the tiles based on at least the indicia characteristic.

12. The decoding device of claim 11, wherein the indicia comprises a two-dimensional (2D) indicia.

13. The decoding device of claim 11, wherein:
the indicia comprises a one-dimensional (1D) bar code; and
the at least one transform comprises a Saporetti transform.

14. The decoding device of claim 1, wherein each grayscale value consists of a value selected from a group consisting of:
a level of intensity of a monochromatic pixel, wherein the captured image is a monochromatic image;
a level of intensity of a color pixel, wherein the captured image is a color image and the grayscale value is accompanied by at least one chrominance value that specifies a color of the color pixel; and
a level of intensity of a color component of a plurality of color components that cooperate to specify a color of a color pixel, wherein the captured image is a color image.

15. A decoding system comprising:
multiple cameras, wherein:
each camera comprises an image sensor configured to capture an image of multiple captured images; and
each camera output a captured image of the multiple captured images as a bitstream of image data comprising grayscale values of pixels in a two-dimensional (2D) array of pixels of the captured image; and
a processor coupled to the multiple cameras, the processor comprising:
multiple single-instruction multiple data (SIMD) components, wherein, for each captured image:
at least one available SIMD component of the multiple SIMD components is selected to perform at least one transform with the grayscale values of the pixels of at least one portion of the captured image to generate at least one metadata that corresponds to the captured image; and
the at least one available SIMD component is configured to perform the at least one transform in preparation for an analysis of the at least one metadata by at least one core component; and
the at least one core component configured to:
perform the analysis of the at least one metadata to identify at least one region of interest (ROI) within the captured image that is indicated by the at least one metadata to include at least one encoded data marking; and
perform a decoding of the at least one ROI identified within the captured image to attempt a decode of the at least one encoded data marking within the at least one ROI.

16. The decoding system of claim 15, wherein:
the at least one encoded data marking comprises multiple encoded data markings of different types;
each type of the different types is selected from a group consisting of a one-dimensional (1D) indicia, a two-dimensional (2D) indicia, and a digital watermark; and
the selection of the at least one available SIMD component to perform the at least one transform with the grayscale values of the pixels of the at least one portion of each captured image comprises a selection of a separate available SIMD component to perform a different transform for each type of the different types.

17. The decoding system of claim 15, wherein, for each captured image:
the at least one encoded data marking comprises at least one digital watermark;
the performance of the decoding of the at least one ROI comprises a performance of watermark decoding of either the grayscale values of the pixels within the at least one ROI, or grayscale values of pixels of rectified ROI data generated for the at least one ROI, to decode the at least one digital watermark within the at least one ROI;
the at least one core component is further configured to determine whether rectification is to be performed with the grayscale values of the pixels within the at least one ROI identified during the analysis to generate the rectified ROI data; and
at least one other available SIMD component of the multiple SIMD components is configured to, in response to a determination that rectification is to be performed with the grayscale values of the pixels within the at least one ROI identified within the captured image, perform the rectification in preparation for the performance of the watermark decoding.

18. The decoding system of claim 17, wherein, for each captured image, the core component is configured to:
receive, from at least one sensor coupled to the processor, input indicative of a degree of skew of a surface of an object that is within a field of view (FOV) of a camera of the multiple cameras from a plane of the pixels of the captured image; and determine whether to perform the rectification based on the degree of skew.

19. The decoding system of claim 15, wherein:

the at least one core component comprises multiple core components;

a first core component of the multiple core components is configured to:

monitor the availability of each SIMD component;

for each captured image, perform the selection of the at least one available SIMD component to perform the at least one transform; and for each captured image, select a core component of the multiple core components to perform the analysis of the at least one metadata and the decoding of the at least one ROI; and at least a second core component of the multiple core components is configured to, for each captured image, perform the analysis of the at least one metadata and the decoding of the at least one ROI.

20. The decoding system of claim 15, wherein, for each captured image:

the at least one encoded data marking comprises an indicia;

the metadata comprises a map of metadata values indicative of at least an indicia characteristic of grayscale values of tiles of the pixels within the at least one portion of the captured image; and the at least one core component is configured to identify the at least one ROI among the tiles based on at least the indicia characteristic.

21. The decoding system of claim 20, wherein the indicia comprises a two-dimensional (2D) indicia.

22. The decoding system of claim 20, wherein:

the indicia comprises a one-dimensional (1D) bar code;

the at least one transform comprises a Saporetti transform convolved among pixels of each tile of a plurality of tiles into which the at least one ROI is divided;

the at least one metadata comprises at least one metadata value selected from a set consisting of:

a lowest grayscale value among a 2D array of pixels of a tile;

a highest grayscale value among the 2D array of pixels of a tile;

a value indicative of a contrast between grayscale values of adjacent pixels within the 2D array of pixels of a tile; and a quantity of parallel lines within the 2D array of pixels of a tile; and the analysis of the at least one metadata comprises a comparison of the at least one metadata value to a threshold selected from a set consisting of:

a minimum difference between the highest grayscale value and the lowest grayscale value;

a minimum value for the contrast; and a minimum quantity of parallel lines within a tile of the plurality of tiles.

23. A decoding device comprising:

storage configured to store image data received from at least one camera, wherein the image data comprises grayscale values of pixels in a two-dimensional (2D) array of pixels in each captured image of multiple captured images that are captured by the at least one camera; and a processor coupled to the storage, the processor comprising:

multiple graphics processing unit (GPU) components, wherein, for each captured image:

at least one available GPU component of the multiple GPU components is selected to perform at least one transform with the grayscale values of the pixels of at least one portion of the captured image to generate at least one metadata that corresponds to the captured image; and the at least one available GPU component is configured to perform the at least one transform in preparation for an analysis of the at least one metadata by at least one core component; and the at least one core component configured to:

perform the analysis of the at least one metadata to identify at least one region of interest (ROI) within the captured image that is indicated by the at least one metadata to include at least one encoded data marking; and perform a decoding of the at least one ROI identified within the captured image to attempt a decode of the at least one encoded data marking within the at least one ROI.

24. The decoding device of claim 23, wherein:

the at least one camera comprises multiple cameras;

the at least one core component is configured to receive at least one captured image of the multiple captured images from each camera of the multiple cameras, and store each received image in the storage as part of the image data; and the selection of the at least one available GPU component to perform the at least one transform with the grayscale values of the pixels of the at least one portion of each captured image comprises a selection of a separate available GPU component to perform the transform with the at least one captured image captured by each camera.

25. The decoding device of claim 23, wherein:

each captured image is divided into multiple predetermined portions; and the selection of the at least one available GPU component to perform the at least one transform with the grayscale values of the pixels of the at least one portion of a captured image comprises a selection of a separate available GPU component to perform the transform with each predetermined portion of the multiple predetermined portions of the captured image.

26. The decoding device of claim 23, wherein:

the at least one encoded data marking comprises multiple encoded data markings of different types;

each type of the different types is selected from a group consisting of a one-dimensional (1D) indicia, a two-dimensional (2D) indicia, and a digital watermark; and the selection of the at least one available GPU component to perform the at least one transform with the grayscale values of the pixels of the at least one portion of each captured image comprises a selection of a separate available GPU component to perform a different transform for each type of the different types.

27. The decoding device of claim 23, wherein, for each captured image:

the at least one encoded data marking comprises at least one digital watermark;

the performance of the decoding of the at least one ROI comprises a performance of watermark decoding of either the grayscale values of the pixels within the at least one ROI, or grayscale values of pixels of rectified ROI data generated for the at least one ROI, to decode the at least one digital watermark within the at least one ROI;

the at least one core component is further configured to determine whether rectification is to be performed with the grayscale values of the pixels within the at least one ROI identified during the analysis to generate the rectified ROI data; and at least one other available GPU component of the multiple GPU components is configured to, in response to a determination that rectification is to be performed with the grayscale values of the pixels within the at least one ROI identified within the captured image, perform the rectification in preparation for the performance of the watermark decoding.

28. The decoding device of claim 27, wherein, for each captured image, the at least one core component is configured to determine whether to perform rectification based on a degree of success in past interpretations of digital watermarks where rectification was not performed.

29. The decoding device of claim 23, wherein, for each captured image:

the at least one encoded data marking comprises at least one digital watermark;

the metadata comprises a map of metadata values indicative of at least a watermark characteristic of grayscale values of tiles of the pixels within the at least one portion of the captured image that indicate a set of candidate ROIs; and the at least one core component is configured to identify the at least one ROI from among the set of candidate ROIs based on at least the watermark characteristic.

30. The decoding device of claim 23, wherein, for each captured image:

the at least one encoded data marking comprises an indicia;

the metadata comprises a map of metadata values indicative of at least an indicia characteristic of grayscale values of tiles of the pixels within the at least one portion of the captured image; and the at least one core component is configured to identify the at least one ROI among the tiles based on at least the indicia characteristic.

31. The decoding device of claim 30, wherein the indicia comprises a two-dimensional (2D) indicia.

32. The decoding device of claim 30, wherein:

the indicia comprises a one-dimensional (1D) bar code; and the at least one transform comprises a Saporetti transform.

* * * * *